United States Patent
Takeda

(10) Patent No.: US 12,511,734 B2
(45) Date of Patent: Dec. 30, 2025

(54) X-RAY IMAGE PROCESSING APPARATUS AND X-RAY IMAGE PROCESSING METHOD

(71) Applicant: SHIMADZU CORPORATION, Kyoto (JP)

(72) Inventor: Ryo Takeda, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 165 days.

(21) Appl. No.: 17/523,613

(22) Filed: Nov. 10, 2021

(65) Prior Publication Data
US 2022/0207723 A1    Jun. 30, 2022

(30) Foreign Application Priority Data
Dec. 24, 2020 (JP) ................ 2020-214498

(51) Int. Cl.
*G06T 7/00* (2017.01)
*G06N 3/08* (2023.01)

(52) U.S. Cl.
CPC .......... *G06T 7/0012* (2013.01); *G06N 3/08* (2013.01); *G06T 2207/10116* (2013.01); *G06T 2207/20081* (2013.01); *G06T 2207/20084* (2013.01)

(58) Field of Classification Search
CPC ............. G06T 3/4053; G06T 6/0012; G06T 2207/30101; G06T 2207/10116;
(Continued)

(56) References Cited

U.S. PATENT DOCUMENTS

| | | | |
|---|---|---|---|
| 10,685,429 B2 * | 6/2020 | Mentl | G06T 11/008 |
| 2005/0063611 A1 * | 3/2005 | Toki | G01N 23/046 |
| | | | 382/299 |

(Continued)

FOREIGN PATENT DOCUMENTS

| | | | | |
|---|---|---|---|---|
| EP | 2966613 A1 * | 1/2016 | | G06T 3/4053 |
| JP | 2011-171843 B | 8/2013 | | |

(Continued)

OTHER PUBLICATIONS

Zhong et al., "mage Fusion and Super-Resolution with Convolutional Neural Network," 2016, Pattern Recognition, CCPR 2016, Communications in Computer and Information Science, Springer, vol. 663 (Year: 2016).*

(Continued)

*Primary Examiner* — Emily C Terrell
*Assistant Examiner* — Julia Z. Yao
(74) *Attorney, Agent, or Firm* — Muir Patent Law, PLLC

(57) ABSTRACT

This X-ray image processing apparatus includes: an image acquisition unit; a frequency resolution processing unit configured to perform frequency resolution processing for resolving an X-ray image into a high-frequency component image and a low-frequency component image; a high-resolution image generation unit configured to generate a high-resolution high-frequency component image from the high-frequency component image by a trained learning model, the high-resolution high-frequency component image being an image higher in resolution than the high-frequency component image; and an image synthesis unit configured to synthesize an image based on the low-frequency component image and an image based on the high-resolution high-frequency component image to generate a high-resolution X-ray image.

18 Claims, 13 Drawing Sheets

(58) Field of Classification Search
CPC ............... G06T 5/50; G06T 3/4046; G06T 2207/20081; G06T 2207/20024; G06T 2207/20224; G06V 10/431; G06V 10/89

See application file for complete search history.

(56) References Cited

U.S. PATENT DOCUMENTS

| | | | | |
|---|---|---|---|---|
| 2010/0104167 A1* | 4/2010 | Sakaguchi | ............... | G06T 5/50 382/132 |
| 2011/0200270 A1* | 8/2011 | Kameyama | ............... | G06T 1/00 382/300 |
| 2013/0223719 A1* | 8/2013 | Ohishi | ............... | A61B 6/12 382/132 |
| 2013/0301933 A1* | 11/2013 | Salvador | ............... | G06T 3/4053 382/263 |
| 2018/0263462 A1* | 9/2018 | Miyai | ............... | A61B 1/0661 |
| 2021/0118095 A1* | 4/2021 | Kim | ............... | G06V 10/764 |

FOREIGN PATENT DOCUMENTS

| | | | | | |
|---|---|---|---|---|---|
| JP | 2015166976 A | * | 9/2015 | | |
| JP | 2019-212050 A | | 12/2019 | | |
| KR | 20190040586 A | * | 4/2019 | ........... | G06T 3/4046 |

OTHER PUBLICATIONS

Munadi et al., "Image Enhancement for Tuberculosis Detection Using Deep Learning," 2020, in IEEE Access, vol. 8, pp. 217897-217907, doi: 10.1109/ACCESS.2020.3041867. (Year: 2020).*

Toutounchi et al., "Super-Resolution in Still Images and Videos via Deep Learning," 2019, Queen Mary University of London, Thesis for the Degree of Doctor of Philosophy (Year: 2019).*

Rajan et al., "Generalized interpolation and its application in super-resolution imaging," 2001, Image and Vision Computing, vol. 19, issue 13, pp. 957-969 (Year: 2001).*

Barnes et al., "Computed Tomography (CT) Scanning," TeachMe Anatomy [retrieved Apr. 25, 2018]. Retrieved from Internet <URL: https://teachmeanatomy.info/the-basics/imaging/computed-tomography-ct-scans/> (Year: 2018).*

Azhari et al. "X-Ray Imaging and Computed Tomography." 2020, In: From Signals to Image. Springer, Cham. https://doi.org/10.1007/978-3-030-35326-1_3 (Year: 2020).*

Yin et al., "Simultaneous image fusion and super-resolution using sparse representation," 2013, Information Fusion, vol. 14, No. 3, pp. 229-240. doi: https://doi.org/10.1016/j.inffus.2012.01.008 (Year: 2013).*

Zuo et al., "Multi-Scale Frequency Reconstruction for Guided Depth Map Super-Resolution via Deep Residual Network," in IEEE Transactions on Circuits and Systems for Video Technology, vol. 30, No. 2, pp. 297-306, Feb. 2020, doi: 10.1109/TCSVT.2018.2890271. (Year: 2020).*

Wang et al., "Single Image Super-resolution Using Spatial Transformer Networks," 2017 IEEE 7th Annual International Conference on Cyber Technology in Automation, Control, and Intelligent Systems (Cyber), Honolulu, HI, USA, 2017, pp. 564-567, doi: 10.1109/CYBER.2017.8446446. (Year: 2017).*

Schulter et al., "Fast and accurate image upscaling with super-resolution forests," 2015 IEEE Conference on Computer Vision and Pattern Recognition (CVPR), Boston, MA, USA, 2015, pp. 3791-3799, doi: 10.1109/CVPR.2015.7299003. (Year: 2015).*

Dong et al., "Image Super-Resolution Using Deep Convolutional Networks", arXiv: 1501.00092v3 [cs.CV], Jul. 31, 2015.

Shi et al., "Real-Time Single Image and Video Super-Resolution Using an Efficient Sub-Pixel Convolutional Neural Network", arXiv: 1609.05158v2 [cs.CV], Sep. 23, 2016.

Notice of Reasons for Refusal dated Oct. 31, 2023 for corresponding Japanese Patent Application No. 2020-214498.

First Office Action dated Oct. 31, 2024 for corresponding Chinese Patent Application No. 202111402804.0.

Decision of Refusal dated May 7, 2024 for the corresponding Japanese Patent Application No. 2020-214498.

Decision to Dismiss dated May 23, 2025 issued in relation to the corresponding Chinese Patent Application No. 202111402804.0.

Notice of Reasons for Refusal dated Nov. 4, 2025 for corresponding Japanese Patent Application No. 2024-130676.

* cited by examiner

FIG.6A
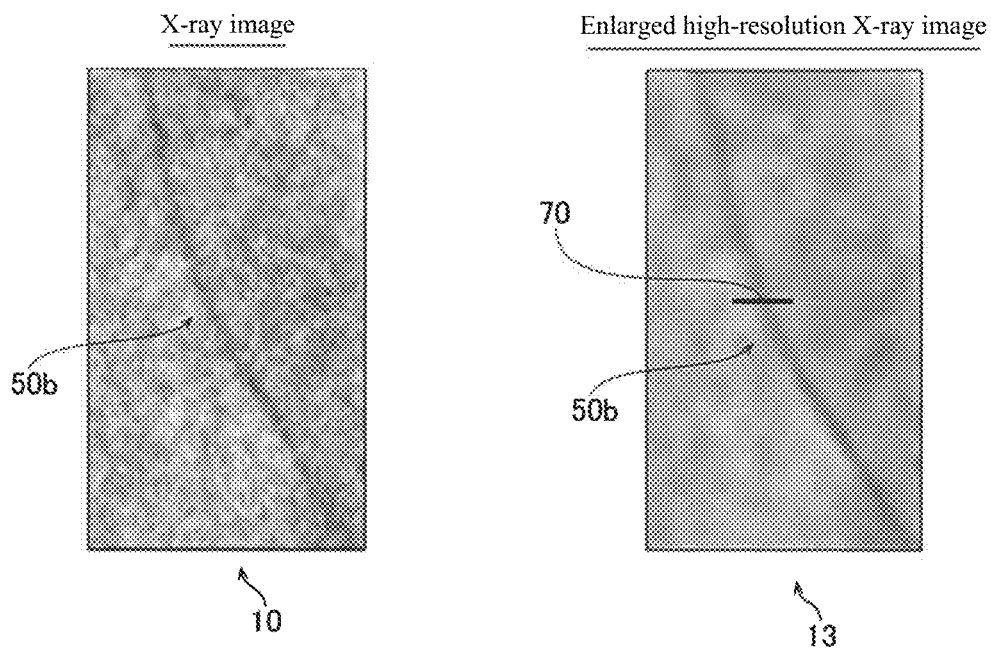
FIG.6B
FIG.6C
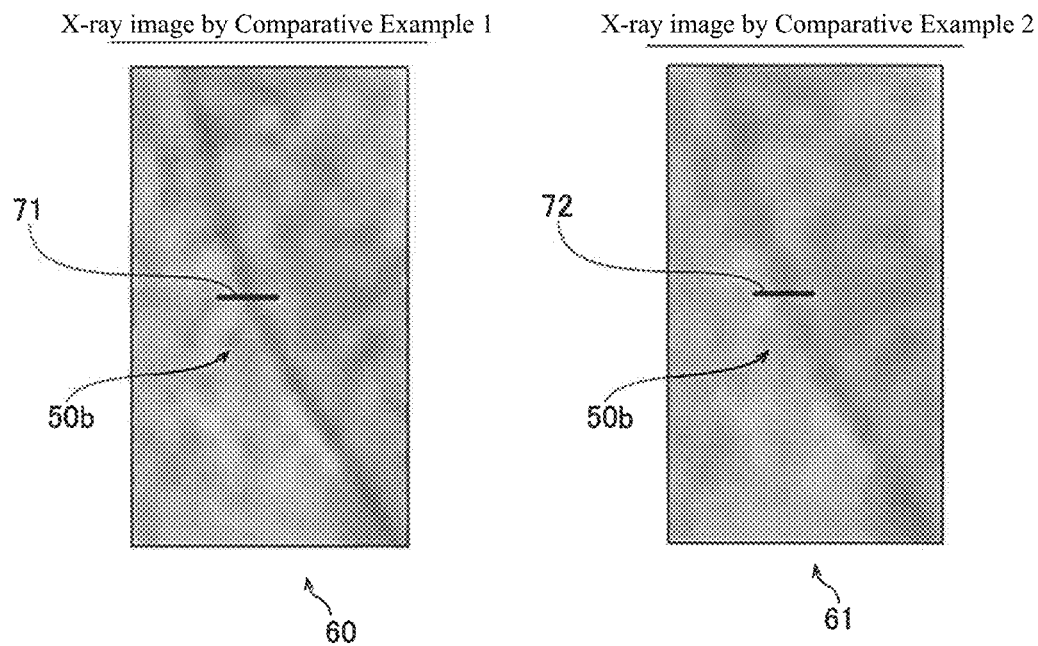
FIG.6D

First modification

First modification

Second modification

Second modification

X-RAY IMAGE PROCESSING APPARATUS AND X-RAY IMAGE PROCESSING METHOD

CROSS-REFERENCE TO RELATED APPLICATIONS

The priority application number JP2020-214498, entitled "X-RAY IMAGE PROCESSING APPARATUS AND X-RAY IMAGE PROCESSING METHOD" filed on Dec. 24, 2020, invented by TAKEDA Ryo, upon which this patent application is based, is herein incorporated by reference.

BACKGROUND OF THE INVENTION

Field of the Invention

The present invention relates to an X-ray image processing apparatus and an X-ray image processing method, and in particular to an X-ray image processing apparatus and an X-ray image processing method capable of improving the resolution of an image by a learning model.

Description of the Background Art

Conventionally, an X-ray image processing apparatus is known to improve the resolution of an image by a learning model. Such an X-ray image processing apparatus is disclosed, for example, in Chao Dong et al., Image Super-Resolution Using Deep Convolutional Networks, arXiv: 1501.00092v3 [cs.CV], 31 Jul. 2015 (hereinafter referred to as Non-Patent Document 1).

Non-Patent Document 1 discloses a configuration in which the resolution of an image is improved by a trained learning model. Specifically, the above-described Non-Patent Document 1 discloses a configuration in which a training low-resolution image and a training high-resolution image are used to cause a learning model to train super-resolution processing that estimates a high-definition high-resolution image from a low-resolution image using a training low-resolution image and a training high-resolution image. In the above-described Non-Patent Document 1, a low-definition image generated by applying enlargement processing on an original image, which is an acquired image, is used as a training low-resolution image. Further, in the above-described Non-Patent Document 1, the original image is used as a training high-resolution image. The super-resolution processing as disclosed in the above-described Non-Patent Document 1 causes the learning model to train so as to bring the definition of the training low-resolution image closer to the definition of the training high-resolution image. In the above-described Non-Patent Document 1, the learning model is configured by three convolution layers.

Here, frequency components of an image include a high-frequency component, such as, e.g., an edge part, and a low-frequency component, such as, e.g., the background. A target site on which a physician or the like focuses is, for example, a blood vessel, a device introduced into a blood vessel, or the like, and is included in a high-frequency component. Generally, the rate of the frequency components in an image is higher in the low-frequency components than in the high-frequency components.

In the learning of the super-resolution processing disclosed in the above-described Non-Patent Document 1, the learning model is cases to learn so as to improve the definition for all frequency components included in an image. Therefore, in the learning of the super-resolution processing disclosed in Non-Patent Document 1, when the rate of the learning for improving the definition of the low-frequency components and the rate of the learning for improving the definition of the high-frequency component are compared, the ratio of the learning to improve the definition of the low-frequency component becomes larger.

Therefore, when the processing for improving the resolution and definition of an image is performed by the super-resolution processing as disclosed in the above-described Non-Patent Document 1, there is the following disadvantage. That is, the degree of improving the definition of the high-frequency component is lower than the degree of improving the definition of the low-frequency component. In such a case, even if the super-resolution processing is performed, the high-frequency components may not be finely defined. As a result, there is a case in which the visibility of the target site on which the doctor or the like focuses included in the high-frequency components will not be improved.

SUMMARY OF THE INVENTION

The present invention has been made to solve the aforementioned problems. One of the objects of the present invention is to provide an X-ray image processing apparatus and an X-ray image processing method capable of improving the visibility of a target site by suppressing the incapable of attaining high definition of high-frequency components when performing super-resolution processing.

In order to achieve the above-described object, the X-ray image processing apparatus according to a first aspect of the present invention, includes:
  an image acquisition unit configured to acquire an X-ray image;
  a frequency resolution processing unit configured to perform frequency resolution processing for resolving the X-ray image into a high-frequency component image and a low-frequency component image;
  a high-resolution image generation unit configured to generate a high-resolution high-frequency component image from the high-frequency component image by a trained learning model that has trained to enhance a resolution of an image, the high-resolution high-frequency component image being an image higher in resolution than the high-frequency component image; and
  an image synthesis unit configured to synthesize an image based on the low-frequency component image and an image based on the high-resolution high-frequency component image to generate a high-resolution X-ray image.

Further, in order to achieve the above-described object, the X-ray image processing method according to a second aspect of the present invention includes the steps of:
  acquiring an X-ray image;
  performing frequency resolution processing for resolving the X-ray image into a high-frequency component image and a low-frequency component image;
  producing a high-resolution high-frequency component image from the high-frequency component image by a trained learning model, the high-resolution high-frequency component image being an image higher in resolution than the high-frequency component image; and
  synthesizing an image based on the low-frequency component image and an image based on the high-resolution high-frequency component image to generate a high-resolution X-ray image.

In the X-ray image processing apparatus in the first aspect above, as described above, the X-ray image processing apparatus includes: a frequency resolution processing unit configured to perform frequency resolution processing for resolving the X-ray image into a high-frequency component image and a low-frequency component image; a high-resolution image generation unit configured to generate a high-resolution high-frequency component image from the high-frequency component image, the high-resolution high-frequency component image being an image higher in resolution than the high-frequency component image; and an image synthesis unit configured to synthesize an image based on the low-frequency component image and an image based on the high-resolution high-frequency component image to generate a high-resolution X-ray image.

This allows the high-resolution image generation unit to improve the resolution in a state in which the low-frequency component image and the high-frequency component image are separated. Therefore, it is possible to suppress the decrease in the degree of high definition of the high-frequency component image, as compared with the configuration in which processing for improving the resolution is performed on an X-ray image containing both the high-frequency components and the low-frequency components. As a result, it is possible to provide an X-ray image processing apparatus capable of improving the visibility of the target site by suppressing the incapability of attaining a high definition of high-frequency components when performing super-resolution processing.

In the X-ray image processing method according to the above-described second aspect of the present invention, as described above, the X-ray image processing method includes the steps of: performing frequency resolution processing for resolving the X-ray image into a high-frequency component image and a low-frequency component image; producing a high-resolution high-frequency component image from the high-frequency component image by a trained learning model, the high-resolution high-frequency component image being an image higher in resolution than the high-frequency component image; and synthesizing an image based on the low-frequency component image and an image based on the high-resolution high-frequency component image to generate a high-resolution X-ray image.

With this configuration, in the same manner as in the X-ray image processing apparatus according to the above-described first aspect of the present invention, it is possible to provide an X-ray image processing method capable of improving the visibility of the target site by suppressing the incapability of attaining the high-definition of the high-frequency components when performing super-resolution processing,

BRIEF DESCRIPTION OF THE DRAWINGS

FIG. 6A is a schematic diagram for explaining an X-ray image.

FIG. 6B is a schematic diagram for explaining a high-resolution X-ray image according to one embodiment.

FIG. 6C is a schematic diagram for explaining an X-ray image according to Comparative Example 1.

FIG. 6D is a schematic diagram for explaining an X-ray image according to Comparative Example 2.

DESCRIPTION OF THE PREFERRED EMBODIMENTS

Hereinafter, embodiments in which the present invention is embodied will be described with reference to the attached drawings.

Figure 1:
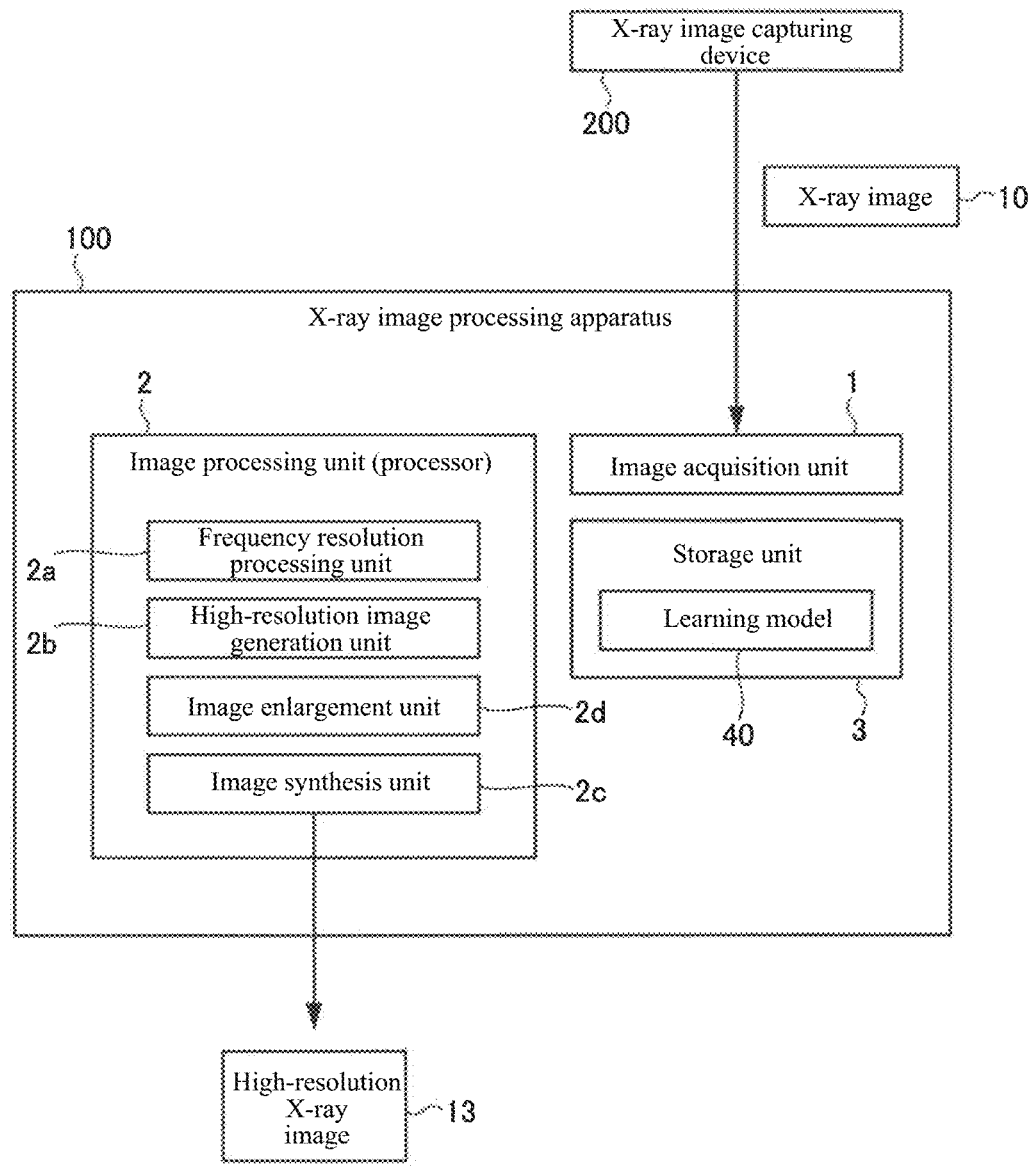
FIG. 1 is a schematic diagram showing an entire configuration of an X-ray image processing apparatus according to one embodiment.
Figure 2:
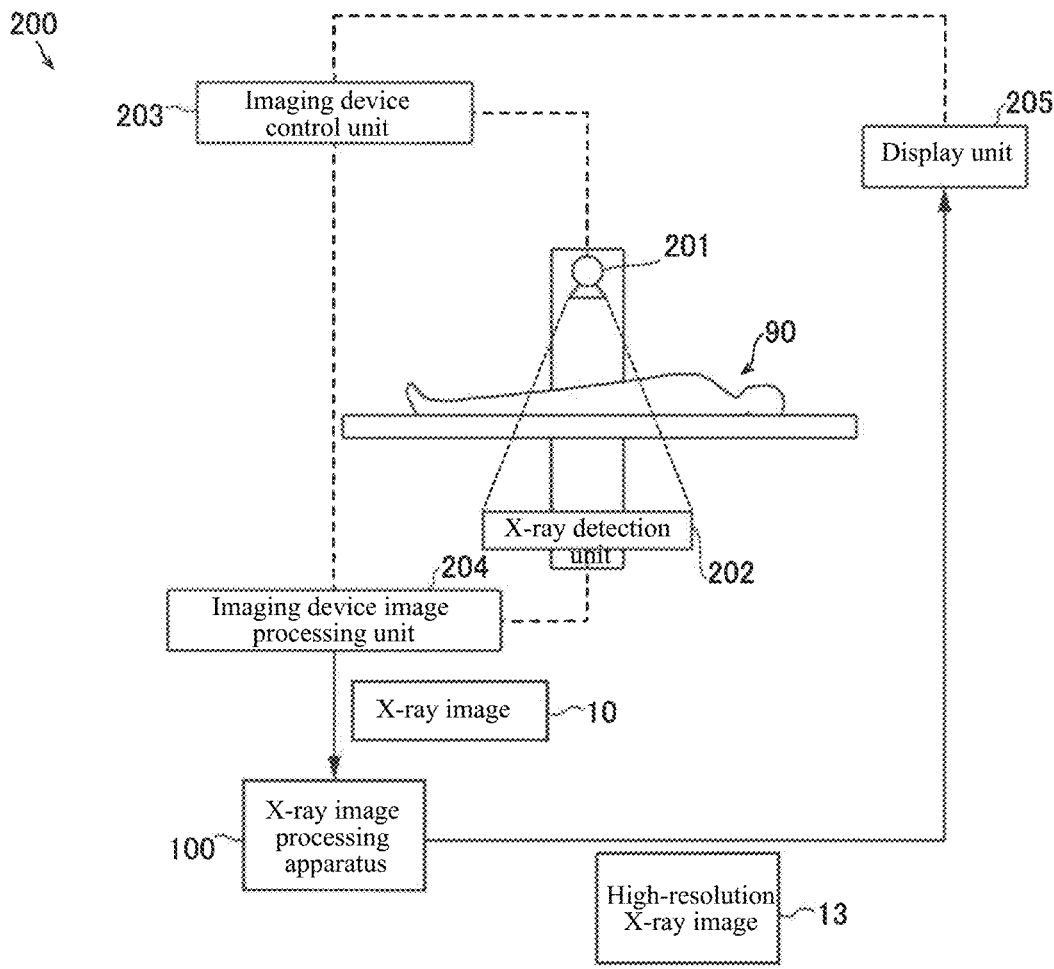
FIG. 2 is a schematic diagram for explaining a configuration of an X-ray image capturing device.

Referring to FIGS. 1 and 2, the configuration of an X-ray image processing apparatus 100 according to one embodiment will be described. In this embodiment, the configuration of the X-ray image processing apparatus 100 as an image processing apparatus for a medical X-ray image will be described.

(Configuration of X-Ray Image Processing Apparatus)

As shown in FIG. 1, the X-ray image processing apparatus 100 is provided with an image acquisition unit 1, an image processing unit 2, and a storage unit 3.

The image acquisition unit 1 is configured to acquire an X-ray image 10. In this embodiment, the image acquisition unit 1 is configured to acquire, for example, the X-ray image 10 from an X-ray image capturing device 200. The image acquisition unit 1 includes, for example, an I/O interface.

The image processing unit 2 is configured to generate a high-resolution X-ray image 13 with an enhanced resolution of the acquired X-ray image 10. The image processing unit 2 is a computer configured to include a CPU (Central Processing Unit), a ROM (Read Only Memory), a RAM (Random Access Memory), a GPU (Graphics Processing Unit), and a processor, such as, e.g., an FPGA (Field-Programmable Gate Array) configured for image processing.

The image processing unit 2 configured by a CPU or the like as hardware includes, as functional blocks of software (programs), a frequency resolution processing unit 2a, a high-resolution image generation unit 2b, and an image synthesis unit 2c.

Further, in this embodiment, the image processing unit 2 includes an image enlargement unit 2d as a functional block. The image processing unit 2 functions as the frequency resolution processing unit 2a, the high-resolution image generation unit 2b, the image synthesis unit 2c, and the image enlargement unit 2d, by executing a program stored in a storage unit 3. The frequency resolution processing unit 2a, the high-resolution image generation unit 2b, the image synthesis unit 2c, and the image enlargement unit 2d may be individually configured by hardware providing a dedicated processor (processing circuitry). The details of each functional block of the image processing unit 2 will be described later.

The storage unit 3 is configured to store the X-ray image 10, the high-resolution X-ray image 13, and a learning model 40. Further, the storage unit 3 is configured to store various programs to be executed by the image processing unit 2. The storage unit 3 includes, for example, a nonvolatile memory, such as, e.g., an HDD (Hard Disk Drive) and an SSD (Solid State Drive).

(Configuration of X-Ray Image Capturing Device)

As shown in FIG. 2, the X-ray image capturing device 200 is provided with an X-ray source 201, an X-ray detection unit 202, an imaging device control unit 203, an imaging device image processing unit 204, and a display unit 205. The imaging device control unit 203 is electrically connected to the X-ray source 201, the imaging device image processing unit 204, and the display unit 205. The X-ray detection unit 202 is also electrically connected to the imaging device image processing unit 204. The X-ray image capturing device 200 generates an X-ray image 10 by imaging a subject 90. Further, the X-ray image capturing device 200 also sends the generated X-ray image 10 to the X-ray image processing apparatus 100.

In the example shown in FIG. 2, the electrical connection is illustrated by a broken line, and the input and output on information is illustrated by a solid line with an arrow.

The X-ray source 201 generates X-rays when a high voltage is applied. The X-rays generated by the X-ray source 201 is configured to be emitted in the direction in which the X-ray detection unit 202 is arranged.

The X-ray detection unit 202 detects the X-rays emitted from the X-ray source 201 and converts the detected X-rays into electric signals. The X-ray detection unit 202 is, for example, an FPD (Flat Panel Detector). The detection signal (image signal) of the X-ray detection unit 202 is transmitted to the imaging device image processing unit 204.

The imaging device control unit 203 is configured to control the X-ray image capturing device 200. The imaging device control unit 203 includes, for example, a CPU, a ROM, a RAM, and the like.

The imaging device image processing unit 204 is configured to generate an X-ray image 10 based on the detection signal sent from the X-ray detection unit 202. The imaging device image processing unit 204 includes, for example, a processor, such as, e.g., a GPU, or an FPGA configured for imaging.

The X-ray image 10 generated in the imaging device image processing unit 204 is sent to the X-ray image processing apparatus 100.

The display unit 205 is configured to display a high-resolution X-ray image 13 generated in the X-ray image processing apparatus 100. The display unit 205 includes, for example, a display device, such as, e.g., a liquid crystal monitor.

(X-ray Image)

Figure 3:
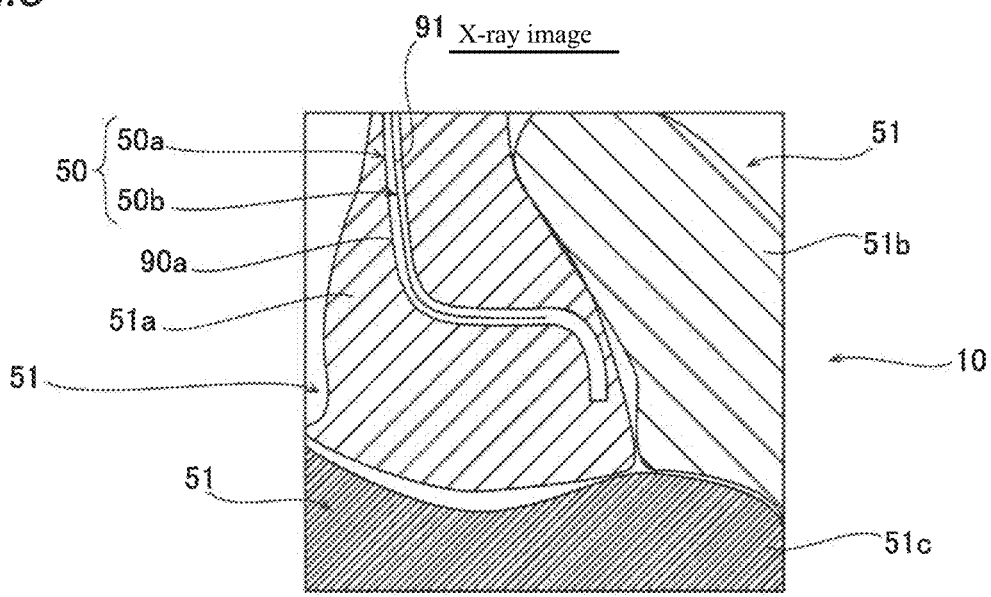
FIG. 3 is a schematic diagram for explaining an X-ray image reflecting a target site and a non-target site.

As shown in FIG. 3, the X-ray image 10 is an image acquired by imaging the subject 90 (see FIG. 2). Specifically, the X-ray image 10 is an image in which a blood vessel 90a of the subject 90 and a device 91 introduced into the blood vessel 90a are reflected. Further, in the X-ray image 10, a target site 50 and a non-target site 51 are reflected. The target site 50 includes, for example, the edge 50a of the blood vessel 90a and the edge 50b of the device 91 The non-target site 51 includes, for example, a heart 51a, a lung 51b, and a diaphragm 51c of the subject 90. Further, the device 91 includes, for example, a stent, a catheter, a guidewire, and the like.

(Image Processing Method)

Next, referring to FIGS. 4 and 5, the configuration for generating the enlarged high-resolution X-ray image 13 from the X-ray image 10 by the image processing method according to this embodiment will be described.

Figure 4:
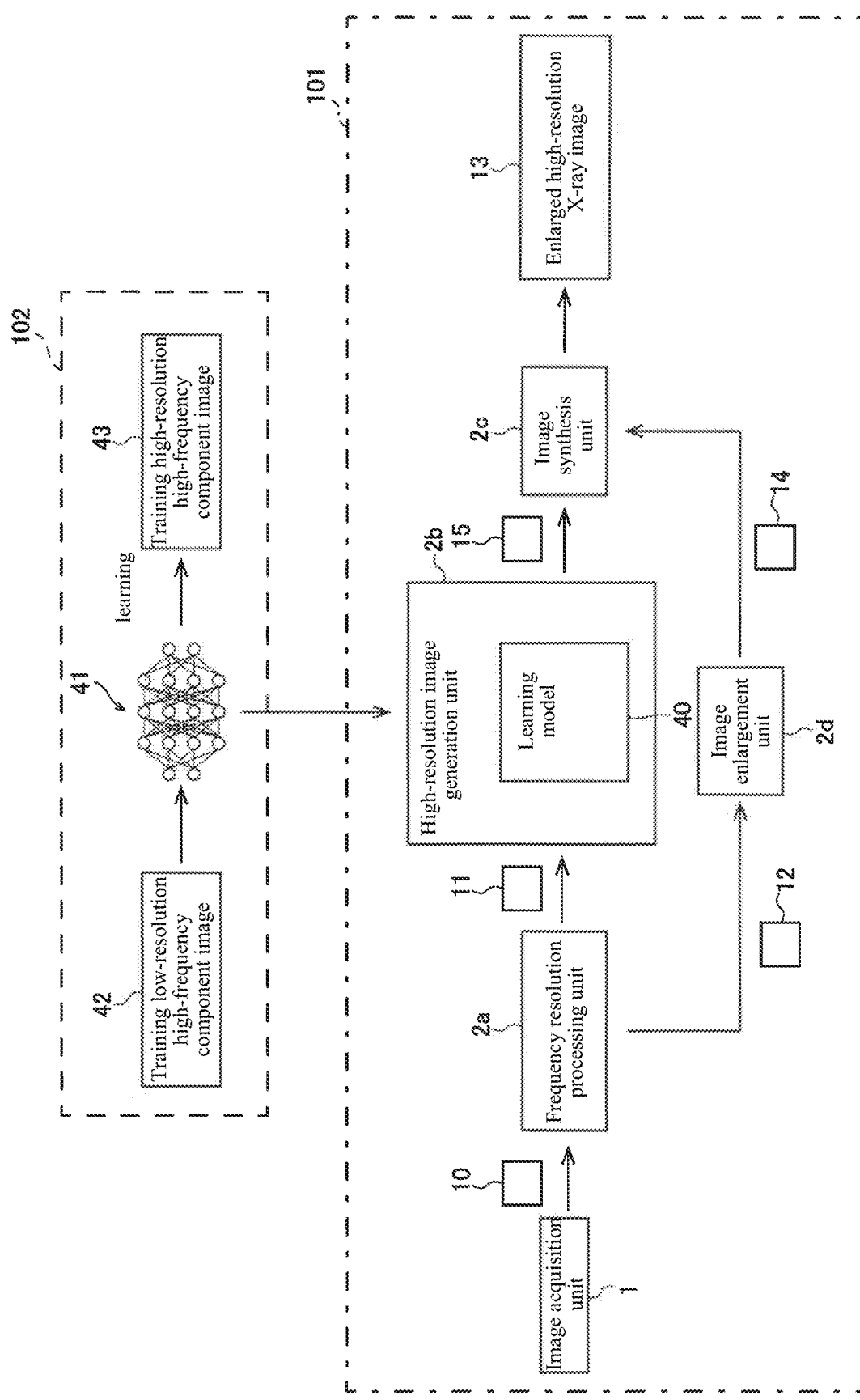
FIG. 4 is a schematic diagram for explaining a learning method of a learning model according to one embodiment and a method of generating a high-resolution X-ray image from an X-ray image using a trained learning model.

FIG. 4 is a block diagram showing the imaging processing flow according to this embodiment. As shown in FIG. 4, in this embodiment, the image processing method roughly includes an X-ray image processing method 101 and a learning method 102 of the learning model 41.

(Learning Model Generation)

The learning method 102 of the learning model 41 according to this embodiment trains the learning model 41 to improve the resolution of the high-frequency components by using a training low-resolution high-frequency component image 42 and a training high-resolution high-frequency component image 43. Further, in this embodiment, when training the learning model 41, it is further trained such that the resolution is improved and the image is enlarged. In this specification, the "enlarge" means to enlarge the image resolution. Further, in this specification, the "high-resolution" means that the definition is high. Further, the "low-resolution" means that the definition is low.

In this embodiment, for example, the learning model 41 is trained to improve the resolution so that an image of 1024×1024 resolution becomes an image of 2048×2048 resolution. In this embodiment, for example, the learning model 41 is trained to enlarge an image by four times. The learning model 41 is, for example, a convolutional neural network (Convolutional neural network; CNN) shown in FIG. 4, or includes a part of a convolutional neural network. The learning model 40 generated by training the learning model 41 is stored in the storage unit 3 (FIG. 1) of the X-ray image processing apparatus 100. Note that the method of training the learning model 41 is not limited.

(X-Ray Image Processing Method)

The X-ray image processing method 101 according to this embodiment is an X-ray image processing method that generates a high-resolution high-frequency component image from a high-frequency component image 11. The X-ray image processing method 101 according to this embodiment includes: a step of acquiring an X-ray image 10; a step of performing frequency resolution processing for resolving the X-ray image 10 into a high-frequency component image 11 and a low-frequency component image 12; a step of generating, by the trained learning model 40, a high-resolution high-frequency component image which is an image higher in resolution than the high-frequency component image 11 from the high-frequency component image 11; and a step for generating a high-resolution X-ray image 13 by synthesizing the image based on the low-frequency component image 12 and the image based on the high-resolution high-frequency component image. The detailed processing of each step of the X-ray image processing method 101 will be described later.

In this embodiment, as shown in FIG. 4, the step of acquiring the X-ray image 10 is performed by the image acquisition unit 1. The image acquisition unit 1 acquires the X-ray image 10 from the X-ray image capturing device 200. Further, the image acquisition unit 1 outputs the acquired X-ray image 10 to the frequency resolution processing unit 2a.

In this embodiment, as shown in FIG. 4, the step for performing the frequency resolution processing is performed by the frequency resolution processing unit 2a. The frequency resolution processing unit 2a is configured to perform the frequency resolution processing for resolving the X-ray image 10 into a high-frequency component image 11 and a low-frequency component image 12.

Further, in this embodiment, as shown in FIG. 4, the step for generating a high-resolution high-frequency component image is performed by the high-resolution image generation unit 2b. The high-resolution image generation unit 2b is configured to generate a high-resolution high-frequency component image which is an image higher in resolution than the high-frequency component image 11 from the high-frequency component image 11, by the trained learning model 40 which has been trained to enhance the resolution of the image.

Note that, as shown in FIG. 4, in this embodiment, the high-resolution image generation unit 2b is configured to perform the processing for generating a high-resolution high-frequency component image from the high-frequency component image 11, without performing the processing for generating an image higher in resolution than the low-frequency component image 12 from the low-frequency component image 12. That is, in this embodiment, the high-resolution image generation unit 2b performs the processing for improving the resolution only for the high-frequency component image 11.

Further, in this embodiment, as shown in FIG. 4, the step of generating the high-resolution X-ray image 13 is performed by the image synthesis unit 2c. The image synthesis unit 2c is configured to generate the high-resolution X-ray image 13 by synthesizing the image based on the low-frequency component image 12 and the image based on the high-resolution high-frequency component image 15.

(Configuration for Generating High-Resolution X-Ray Image)

Next, referring to FIG. 5, the configuration in which the image processing unit 2 generates the enlarged high-resolution X-ray image 13 from the X-ray image 10 will be described. Note that, in the example shown in FIG. 5, a configuration for generating the high-resolution X-ray image 13 having a size four times the size of the X-ray image 10 is shown.

The frequency resolution processing unit 2a (see FIG. 4) acquires the X-ray image 10 from the image acquisition unit 1. Further, the frequency resolution processing unit 2a performs the frequency resolution processing for resolving the acquired X-ray image 10 to generate the high-frequency component image 11 and the low-frequency component image 12. Further, the frequency resolution processing unit 2a outputs the generated high-frequency component image 11 to the high-resolution image generation unit 2b. Further, the frequency resolution processing unit 2a outputs the generated low-frequency component image 12 to the image enlargement unit 2d.

The size and definition of the high-frequency component image 11 are similar to the size and definition of the X-ray image 10. The size and definition of the low-frequency component image 12 are also the same as the size and definition of the X-ray image 10.

In this embodiment, the frequency resolution processing unit 2a is configured to perform the frequency resolution processing in which the frequency band to be resolved is set such that the frequency components of the predetermined target site 50 in the X-ray image 10 become high-frequency side components.

Specifically, the frequency resolution processing unit 2a is configured to resolve the X-ray image 10 at a predetermined frequency such that the frequency components of the edge 50a (see FIG. 3) of the blood vessel 90a (see FIG. 3) and the frequency components of the edge 50b (see FIG. 3) of the device 91 (see FIG. 3) become high-frequency side components. That is, the frequency resolution processing unit 2a resolves the X-ray image 10 such that the frequency components of the target site 50 become a state in which the frequency components of the target site 50 are not included in both the high-frequency component image 11 and the low-frequency component image 12 but included in the high-frequency component image 11 and not included in the low-frequency component image 12.

It should be noted that it is enough that the majority of the frequency components of the target site 50 are included in the high-frequency component image 11 and it is allowed that some frequency components are included in the low-frequency component image 12.

Further, in this embodiment, the frequency resolution processing unit 2a performs the smoothing filter processing on the X-ray image 10 to acquire the low-frequency component image 12. Specifically, the frequency resolution processing unit 2a acquires the low-frequency component image 12 by using a Gaussian filter for the X-ray image 10.

Further, the frequency resolution processing unit 2a is configured to subtract the low-frequency component image 12 from the X-ray image 10 to acquire the high-frequency component image 11. That is, in this embodiment, the frequency resolution processing unit 2a resolves the X-ray image 10 into two images of the high-frequency component image 11 and the low-frequency component image 12. Further, when combining the high-frequency component image 11 and the low-frequency component image 12, the X-ray image 10 is acquired.

The image enlargement unit 2d (see FIG. 4) is configured to enlarge the image either before performing the frequency resolution processing or after performing the frequency resolution processing by the frequency resolution processing unit 2a. In this embodiment, the image enlargement unit 2d enlarges the image after performing the frequency resolution processing. That is, in this embodiment, the low-frequency component image 12 is input to the image enlargement unit 2d.

Further, the image enlargement unit 2d is configured to enlarge the low-frequency component image 12 acquired by performing the frequency resolution processing by the frequency resolution processing unit 2a to generate a low-frequency component enlarged image 14. Further, the image enlargement unit 2*d* outputs the low-frequency component enlarged image 14 to the image synthesis unit 2*c*.

Further, in this embodiment, the image enlargement unit 2*d* is configured to enlarge the image by the reversibly convertible interpolation algorithm. The reversibly convertible interpolation algorithm includes, for example, a nearest neighbor algorithm. The nearest neighbor algorithm is a method in which the pixel value at a position closest to the pixel undetermined in the pixel value generated by the enlargement is used as the pixel value of the pixel when an image is enlarged.

Note that the size of the low-frequency component enlarged image 14 is four times the size of the low-frequency component image 12. The definition of the low-frequency component enlarged image 14 becomes lower than that of the low-frequency component image 12. The low-frequency component enlarged image 14 is an example of the "image based on the low-frequency component image" as recited in claims.

Further, in this embodiment, the learning model 40 (see FIG. 4) has further trained to enlarge an image to be generated when enhancing the resolution of the image. The high-resolution image generation unit 2*b* (see FIG. 4) is configured to generate a high-resolution high-frequency component enlarged image 15 improved in resolution than the high-frequency component image 11 and increased in size by the learning model 40.

Figure 5:
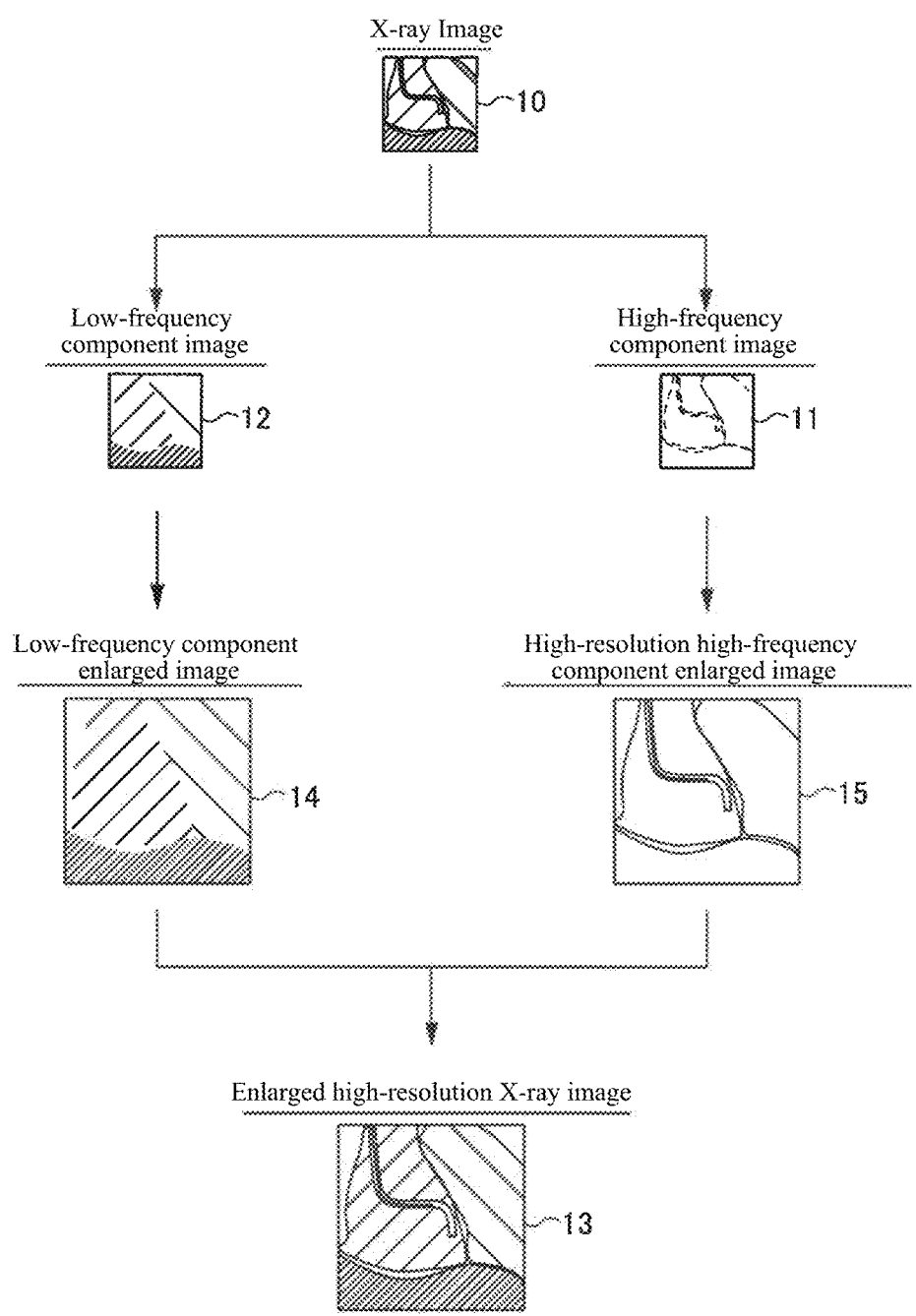
FIG. 5 is a schematic diagram for explaining frequency resolution processing, enlargement processing, processing for improving a resolution, and processing for generating a high-resolution X-ray image according to one embodiment.

In the example shown in FIG. 5, the high-frequency component image 11 is input to the high-resolution image generation unit 2*b*. The high-resolution image generation unit 2*b* performs the processing for increasing the size of the input high-frequency component image 11 and enhancing the definition thereof. Specifically, the high-resolution image generation unit 2*b* generates a high-resolution high-frequency component enlarged image 15 with a size four times the size of the high-frequency component image 11 and a definition higher than the high-frequency component image 11. The high-resolution image generation unit 2*b* outputs the generated high-resolution high-frequency component enlarged image 15 to the image synthesis unit 2*c*. The high-resolution high-frequency component enlarged image 15 is an example of the "image based on the high-resolution high-frequency component image" and the "image based on the high-resolution high-frequency component image" recited in claims.

The low-frequency component enlarged image 14 and the high-resolution high-frequency component enlarged image 15 are input to the image synthesis unit 2*c*. The image synthesis unit 2*c* is configured to synthesize the low-frequency component enlarged image 14 and the high-resolution high-frequency component enlarged image 15 to generate the high-resolution X-ray image 13.

In this embodiment, the image synthesis unit 2*c* adds the low-frequency component enlarged image 14 and the high-resolution high-frequency component enlarged image 15 to generate the high-resolution X-ray image 13. In the example shown in FIG. 5, the high-resolution X-ray image 13 is an image with a size four times the size of the X-ray image 10 and definition higher than the image of the X-ray image 10. Further, in this embodiment, the image synthesis unit 2*c* outputs the generated high-resolution X-ray image 13 to the display unit 205 of the X-ray image capturing device 200.

(Moving Image)

In this embodiment, the X-ray image capturing device 200 (see FIG. 2) fluoroscopically images the subject 90 in an X-ray IVR (Interventional Radiology), such as, e.g., a catheter treatment, to capture the X-ray image 10 as a moving image at a predetermined frame rate. The image acquisition unit 1 is configured to acquire the X-ray image 10 as a moving image.

More specifically, the image acquisition unit 1 successively acquires the X-ray image 10 as a frame image in time series. The frequency resolution processing unit 2*a* is configured to perform the frequency resolution processing on the acquired frame each time the frame of the X-ray image 10 as a moving image is acquired. The high-resolution image generation unit 2*b* is configured to generate a high-resolution high-frequency component image from a high-frequency component image 11 acquired for each frame. The image synthesis unit 2*c* is configured to synthesize the low-frequency component image 12 and the high-resolution high-frequency component image of each frame to generate the high-resolution X-ray image 13 as a moving image. Further, the image synthesis unit 2*c* outputs the high-resolution X-ray image 13 as a moving image at a predetermined frame rate to the display unit 205 (see FIG. 2).

Note that the processing for generating the high-resolution X-ray image 13 by the image processing unit 2 according to this embodiment is started when a doctor or the like inputs an operation for enlarging the display.

(High-Resolution X-Ray Image, Comparative Example 1 and Comparative Example 2)

Next, referring to FIG. 6 and FIG. 7, the difference in the definition of the device 91 reflected in an image between the high-resolution X-ray image 13 generated by the image processing unit 2 according to this embodiment and an image generated by the conventional method according to Comparative Example 1 and Comparative Example 2 will be described.

FIG. 6A shows the X-ray image 10 in which a device 91 is reflected. FIG. 6B shows the high-resolution X-ray image 13 generated by the image processing unit 2 according to this embodiment. Further, FIG. 6C shows an enlarged image 60 according to Comparative Example 1 in which the resolution has been improved by the model trained to enhance the resolution without performing the frequency resolution processing on the X-ray image 10. FIG. 6D shows an image 61 according to Comparative Example 2 in which the X-ray image 10 has been enlarged by a nonlinear function. The image 61 is an image enlarged by, for example, a Bicubic interpolation algorithm.

It was confirmed that the device 91 reflecting in the high-resolution X-ray image 13 shown in FIG. 6B is reflected more clearly than the device 91 reflected in the image 60 according to Comparative Example 1 and the device 91 reflected in the image 61 according to Comparative Example 2. It was confirmed in the profile 80 shown in FIG. 7 that the device 91 reflected in the high-resolution X-ray image 13 is more clearly reflected than the device 91 reflected in the image 60 according to Comparative Example 1 and the device 91 reflected in the image 61 according to Comparative Example 2.

Figure 7:
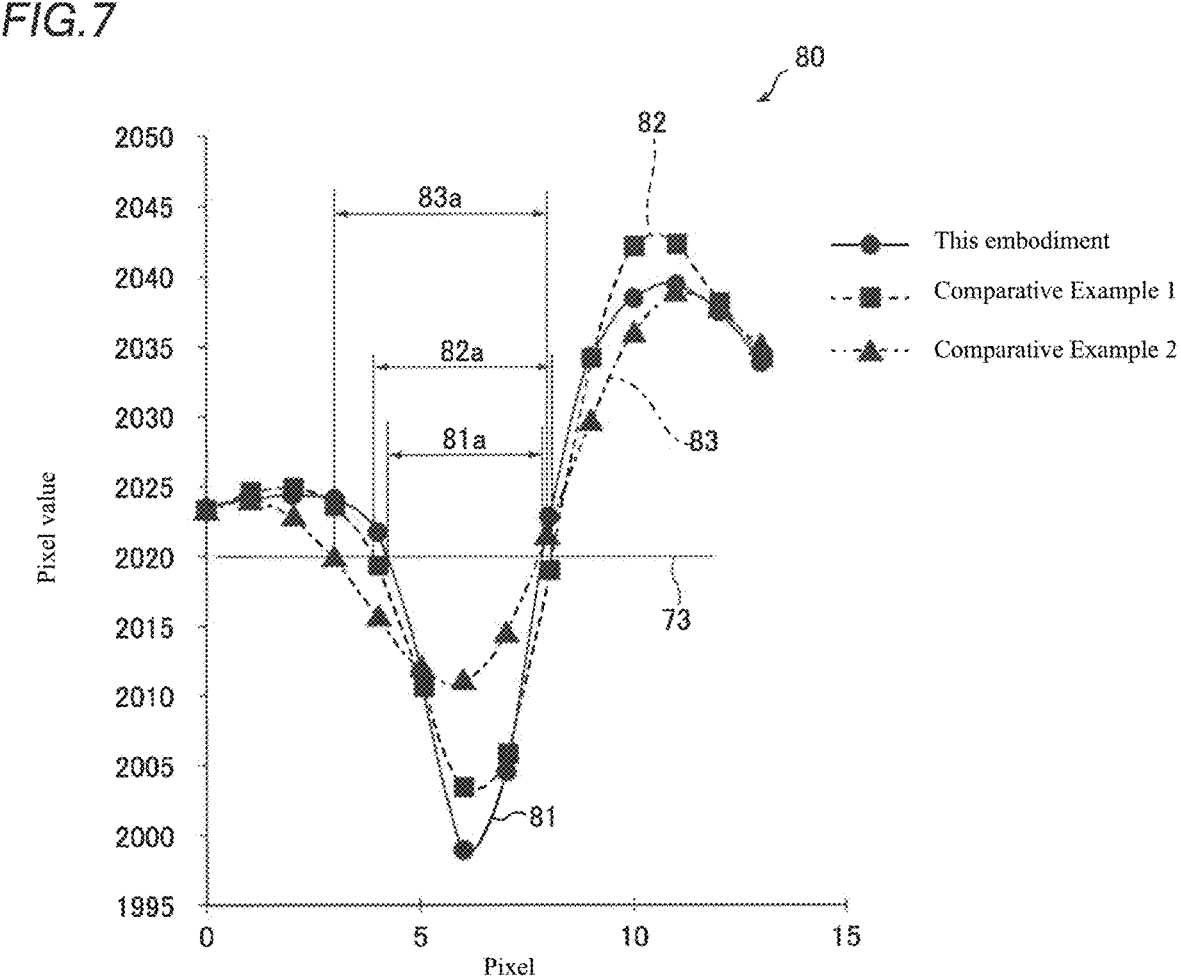
FIG. 7 is a schematic diagram for explaining the device fineness in a high-resolution X-ray image according to one embodiment, an X-ray image according to Comparative Example 1, and an X-ray image according to Comparative Example 2.

In the profile 80 shown in FIG. 7, the horizontal axis represents the position of the pixel, and the vertical axis represents the pixel value. The profile 80 includes the profile 81 of the high-resolution X-ray image 13 according to this embodiment, the profile 82 of the image 60 according to Comparative Example 1, and the profile 83 of the image 61 according to Comparative Example 2.

Each profile is acquired by plotting pixel values of pixels at predetermined positions in the image. The profile 81 is generated by plotting the change in the pixel value for the pixel at the position of the straight line 70 (see FIG. 6) in the high-resolution X-ray image 13 (see FIG. 6). The profile 82 is generated by plotting the change in the pixel value for the pixel of the position of the straight line 71 (see FIG. 6) in the image 60 (see FIG. 6). The profile 83 is generated by plotting the change in the pixel value for the pixel of the position of the straight line 72 (see FIG. 6) in the image 61 (see FIG. 6).

The smallest value of the pixel value in each profile and the width of the valley part of each profile are used as an indicator of the fineness of the device 91 (see FIG. 6). Specifically, the profile with a smaller width of the valley part and a larger depth of the valley part is finer. That is, it means that the larger the slope of the valley part of each profile (the luminance change at the edge) is, the higher the definition is. Note that the width of the valley part means the width of the portion of the profile projected downward. The depth of the valley part means the degree of the protrusion of the valley part of each profile. In the example shown in FIG. 7, based on the width at the position shown by the straight line 73, the definition of the device 91 is confirmed.

As shown in FIG. 7, when the width 81a of the valley part of the profile 81, the width 82a of the valley part of the profile 82, and the width 83a of the valley part of the profile 83 were compared. As a result, it was confirmed that the width 81a of the valley part of the profile 81 was the smallest. Further, the minimum pixel values of the profiles were compared. As a result, it was confirmed that the minimum pixel value of the profile 81 was the smallest. In other words, it was confirmed by the profiles 81 to 83 that the device 91 reflected in the high-resolution X-ray image 13 was the clearest in the high-resolution X-ray image 13 according to this embodiment among the high-resolution X-ray image 13 according to this embodiment, the image 60 according to Comparative Example 1, and the image 61 according to Comparative Example 2.

Figure 8:
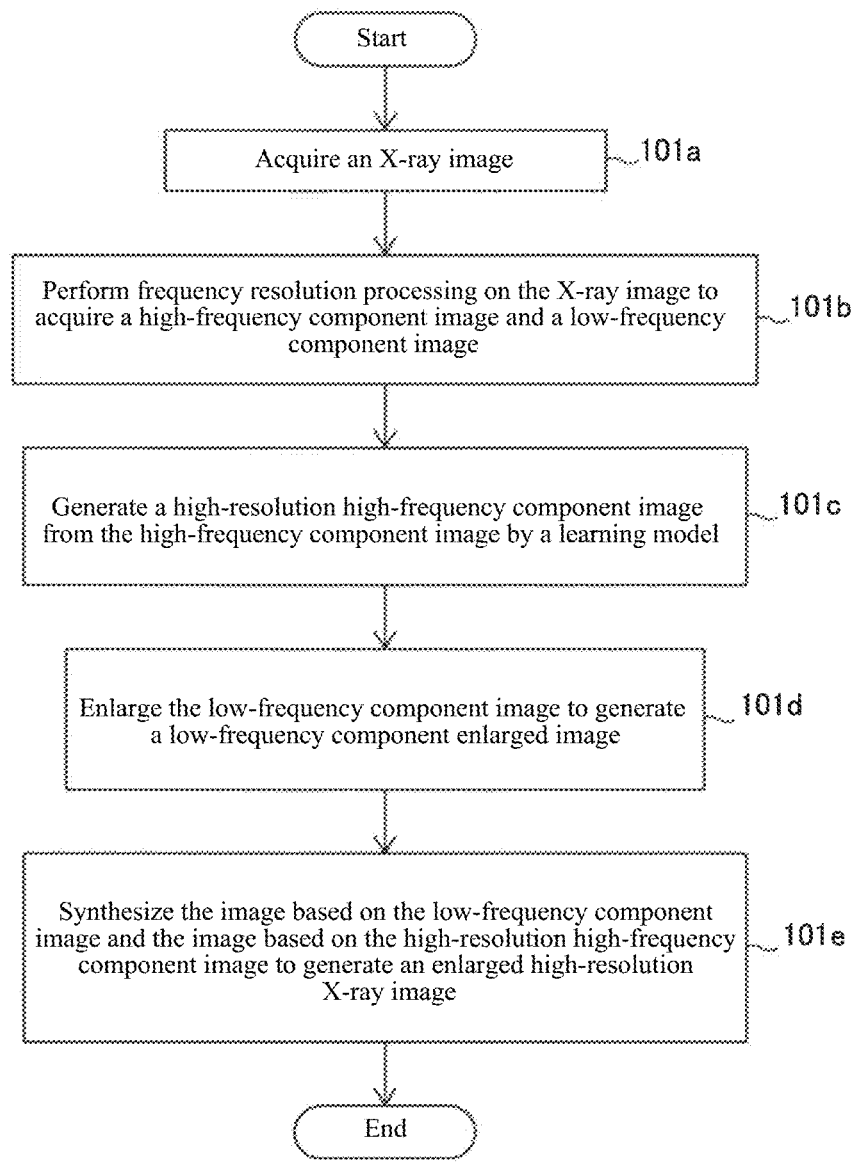
FIG. 8 is a flowchart for explaining the processing in which an image processing unit according to one embodiment generates an enlarged high-resolution X-ray image from an X-ray image.

Next, referring to FIG. 8, the processing in which the image processing unit 2 according to this embodiment generates the enlarged high-resolution X-ray image 13 from the X-ray image 10 will be described.

In Step 101a, the image acquisition unit 1 acquires the X-ray image 10. In this embodiment, the X-ray image 10 as a moving image is acquired on a frame-by-frame basis.

In Step 101b, the frequency resolution processing unit 2a performs the frequency resolution processing on the X-ray image 10 to acquire the high-frequency component image 11 and the low-frequency component image 12.

In Step 101c, the high-resolution image generation unit 2b generates the high-resolution high-frequency component image from the high-frequency component image 11 by the learning model 40. In this embodiment, the high-resolution image generation unit 2b generates the high-resolution high-frequency component enlarged image 15 as a high-resolution high-frequency component image.

In Step 101d, the image enlargement unit 2d enlarges the low-frequency component image 12 to generate the low-frequency component enlarged image 14.

In Step 101e, the image synthesis unit 2c synthesizes the image based on the low-frequency component image 12 and the image based on the high-resolution high-frequency component image to generate the enlarged high-resolution X-ray image 13. Specifically, the image synthesis unit 2c synthesizes the high-resolution high-frequency component enlarged image 15 and the low-frequency component enlarged image 14 to generate the enlarged high-resolution X-ray image 13.

In this embodiment, the image synthesis unit 2c performs the processing of Step 101a to Step 101e on the X-ray image 10 as a moving image to generate the enlarged high-resolution X-ray image 13 as a moving image. Note that either the processing of Step 101c or the processing of Step 101d may be performed first. Further, when the image processing unit 2 can perform both the processing in parallel, the processing of Step 101c and the processing of Step 101d may be performed in parallel at the same time.

Effects of this Embodiment

In this embodiment, the following effects can be obtained.

In this embodiment, as described above, the X-ray image processing apparatus 100 includes: the image acquisition unit 1 for acquiring the X-ray image 10; the frequency resolution processing unit 2a for performing the frequency resolution processing for resolving the X-ray image 10 into the high-frequency component image 11 and the low-frequency component image 12; the high-resolution image generation unit 2b for generating the high-resolution high-frequency component image, which is an image higher in resolution than the high-frequency component image 11, from the high-frequency component image 11 by the trained learning model 40 trained to enhance the resolution of the image; and the image synthesis unit 2c for synthesizing the image based on the low-frequency component image 12 and the image based on the high-resolution high-frequency component image to generate the high-resolution X-ray image 13.

With this, the high-resolution image generation unit 2b improves the resolution in a state in which the low-frequency component image 12 and the high-frequency component image 11 are separated. Therefore, as compared with the configuration for performing the processing for improving the resolution with respect to the X-ray image 10 including components of both the high-frequency components and the low-frequency components, it is possible to suppress the reduction of the degree of the high definition of the high-frequency component image 11. As a result, it is possible to provide the X-ray image processing apparatus 100 capable of improving the visibility of the target site by suppressing the high-frequency component from becoming incapable of attaining the high definition when performing the super-resolution processing.

In this embodiment, as described above, the X-ray image processing method includes: a step of acquiring the X-ray image 10; a step of performing the frequency resolution processing for resolving the X-ray image 10 into the high-frequency component image 11 and the low-frequency component image 12; a step for generating the high-resolution high-frequency component image which is an image higher in resolution than the high-frequency component image 11, from the high-frequency component image 11 by the trained learning model 40; and a step for synthesizing the image based on the low-frequency component image 12 and the image based on the high-resolution high-frequency component image to generate the high-resolution X-ray image 13.

With this, in the same manner as in the above-described X-ray image processing apparatus 100, it is possible to provide an X-ray image processing method capable of improving the visibility of the target site by suppressing that the high-frequency components cannot be highly defined when performing the super-resolution processing.

Further, in the above-described embodiment, the following further effects can be obtained by the following configuration.

That is, in this embodiment, as described above, the high-resolution image generation unit 2b is configured to perform the processing for generating the high-resolution high-frequency component image from the high-frequency component image 11 without performing the processing for generating an image higher in resolution than the low-frequency component image 12, from the low-frequency component image 12. As a result, since the processing for improving the resolution is not performed on the low-frequency component image 12, it is possible to suppress the decrease in the processing speed and the increase in the processing load, as compared with the configuration in which the processing for improving the resolution is performed on both the high-frequency component image 11 and the low-frequency component image 12.

Further, in this embodiment, as described above, the frequency resolution processing unit 2a is configured to perform the frequency resolution processing in which the frequency band to be resolved is set such that the frequency components of the predetermined target site 50 in the X-ray image 10 become high-frequency side components.

As a result, by enhancing the resolution of the high-frequency component image 11 including the frequency components of the target site 50, it is possible to enhance the definition of the target site 50 in the high-resolution high-frequency component enlarged image 15. As a result, the visibility of the target site 50 can be improved in the high-resolution X-ray image 13.

Further, in this embodiment, as described above, the X-ray image 10 is an image in which the blood vessel 90a of the subject 90 and the device 91 introduced into the blood vessel 90a are reflected. The target site 50 is the edge 50a of the blood vessel 90a and the edge 50b of the device 91. With this, it becomes possible to improve the definition of the edge 50a of the blood vessel 90a and the edge 50b of the device 91 in the high-resolution X-ray image 13. Accordingly, in the high-resolution X-ray image 13, it is possible to improve the visibility of the blood vessel 90a and the device 91.

Further, in this embodiment, as described above, the image acquisition unit 1 is configured to acquire the X-ray image 10 as a moving image. The frequency resolution processing unit 2a is configured to perform the frequency resolution processing for the acquired frame each time of acquiring the frame of the X-ray image 10 as a moving image to acquire the low-frequency component image 12 and the high-frequency component image 11 for each frame. The high-resolution image generation unit 2b is configured to generate the high-resolution high-frequency component image from the high-frequency component image 11 acquired for each frame. The image synthesis unit 2c is configured to synthesize the low-frequency component image 12 for each frame and the high-resolution high-frequency component image for each frame to generate the high-resolution X-ray image 13 as a moving image.

With this, the high-resolution X-ray image 13 as a moving image is generated. Therefore, for example, by displaying the high-resolution X-ray image 13 as a moving image on the display device or the like, it is possible to present a moving image in which the visibility of the target site 50 has been enhanced to the operator. As a result, it becomes possible to make the operator confirm the moving image improved in the visibility of the target site 50 in real time when the operator is performing the procedures.

Further, in this embodiment, as described above, the frequency resolution processing unit 2a is configured to perform the smoothing filter processing on the X-ray image 10 to acquire the low-frequency component image 12. Further, the frequency resolution processing unit 2a is configured to subtract the low-frequency component image 12 from the X-ray image 10 to acquire the high-frequency component image 11.

With this, since the frequency resolution processing is performed by the smoothing filter processing, for example, unlike the frequency resolution processing by a Fourier transform in which the frequency resolution processing is performed after acquiring the entire X-ray image 10, it is possible to initiate the frequency resolution processing at the stage when a part of X-ray image 10 has been acquired. As a result, the rate of the frequency resolution processing can be improved.

Further, in this embodiment, as described above, the image enlargement unit 2d for enlarging an image is provided. The image enlargement unit 2d is configured to enlarge the image either before performing the frequency resolution processing by the frequency resolution processing unit 2a or after performing the frequency resolution processing.

As a result, the enlargement processing for an image can be performed at a desired time, either before or after the frequency resolution processing, so that the degree of freedom in the configuration of the image processing can be improved.

Further, in this embodiment, as described above, the image enlargement unit 2d is configured to enlarge the low-frequency component image 12 acquired by performing the frequency resolution processing by the frequency resolution processing unit 2a to generate the low-frequency component enlarged image 14. The learning model 40 is further trained to enlarge the image to be generated when enhancing the resolution of the image. The high-resolution image generation unit 2b is configured to generate the high-resolution high-frequency component enlarged image 15 improved in resolution than the high-frequency component image 11 and enlarged in size from the high-frequency component image 11 by the learning model 40. The image synthesis unit 2c is configured to synthesize the low-frequency component enlarged image 14 and the high-resolution high-frequency component enlarged image 15 to generate the high-resolution X-ray image 13.

With this, it becomes possible to enhance the resolution by the high-resolution image generation unit 2b and enlarge the image. Therefore, as compared with the configuration of enhancing the resolution for the enlarged high-frequency component image 11, it is possible to reduce the size of the image to which the learning model 40 is applied. As a result, it is possible to suppress an increase in the burden of the processing for improving the resolution by the learning model 40.

Further, in this embodiment, as described above, the image enlargement unit 2d is configured to enlarge an image by a reversibly convertible interpolation algorithm. Thus, even when generating the low-frequency component enlarged image 14 by enlarging the low-frequency component image 12 by the enlargement processing, it is possible to suppress the missing of the information on the pixel value of the pixel included in the low-frequency component image 12.

MODIFIED EMBODIMENTS

Embodiments disclosed herein are to be considered in all respects as illustrative and not restrictive. The scope of the present invention is indicated by claims rather than by the above-described descriptions of the embodiment, and includes all modifications within the meanings and scopes equivalent to the claims.

First Modification

For example, in the above-described embodiment, an example is shown in which it is configured such that the image enlargement unit 2d enlarges an image after performing the frequency resolution processing on the X-ray image 10 by the frequency resolution processing unit 2a, but the present invention is not limited thereto. For example, in the first modification shown in FIG. 9, the image enlargement unit 20d may be configured to enlarge the X-ray image 10 before performing the frequency resolution processing by the frequency resolution processing unit 20a.

Figure 9:
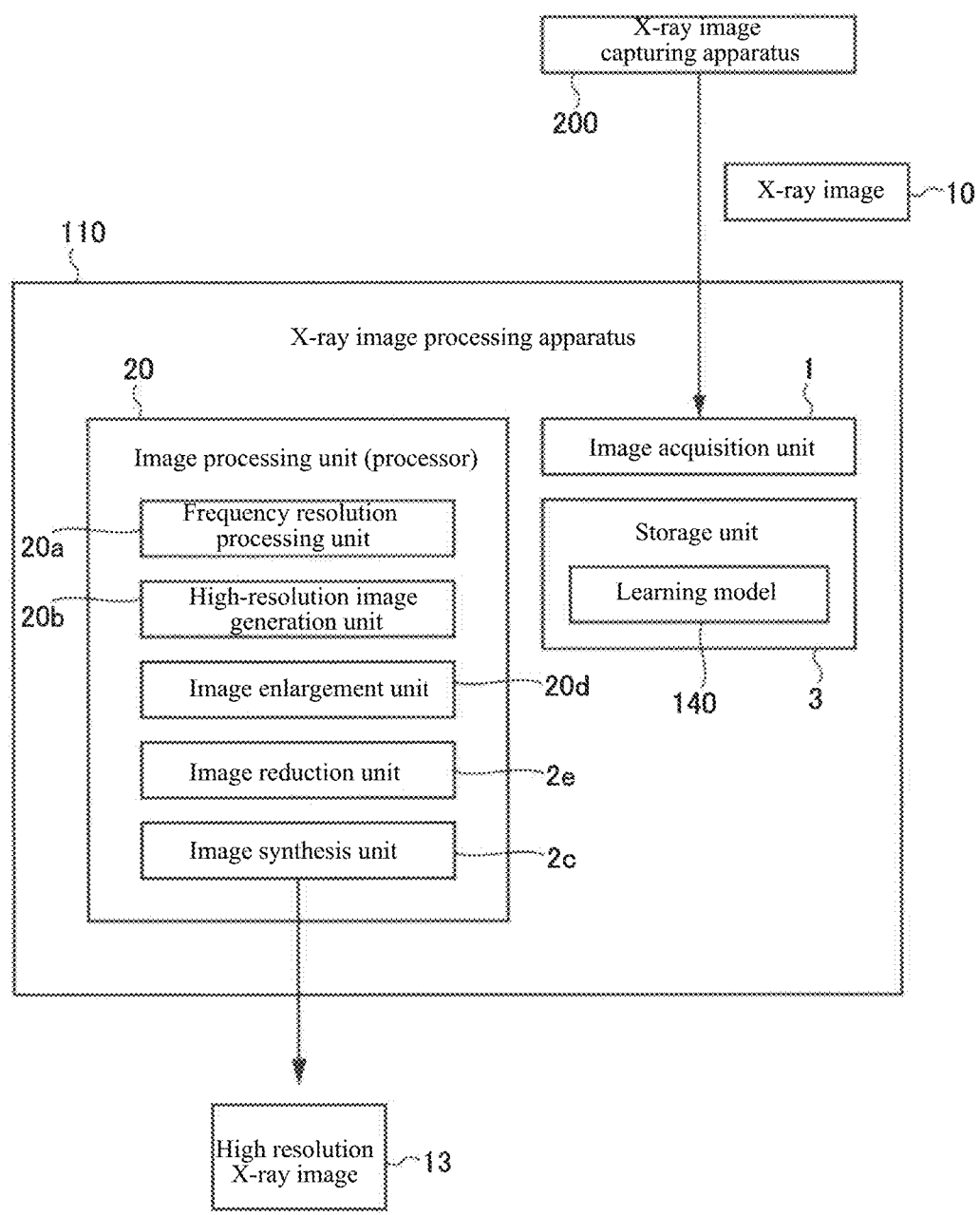
FIG. 9 is a schematic diagram showing an entire configuration of an X-ray image processing apparatus according to a first modification.

As shown in FIG. 9, the X-ray image processing apparatus 110 according to the first modification differs from the X-ray image processing apparatus 100 according to the above-described embodiment in that an image processing unit 20 is provided in place of the image processing unit 2 and a learning model 140 is stored in the storage unit 3 in place of the learning model 40.

The image processing unit 20 differs from the image processing unit 2 according to the image processing unit 2 in that a frequency resolution processing unit 20a is provided in place of the frequency resolution processing unit 2a, a high-resolution image generation unit 20b is provided in place of the high-resolution image generation unit 2b, an image enlargement unit 20d is provided in place of the image enlargement unit 2d, and an image reduction unit 2e for reducing an image is provided.

The learning model 140 differs from the learning model 40 according to the above-described embodiment in that the learning model 140 has been trained to generate the high-resolution high-frequency component enlarged image 15 from the high-frequency component reduced image 18 (see FIG. 10) in place of the high-resolution high-frequency component enlarged image 11. When the size and definition of the high-frequency component image 11 and the size and definition of the high-frequency component reduced image 18 are equal, the learning model 40 may be used.

Figure 10:
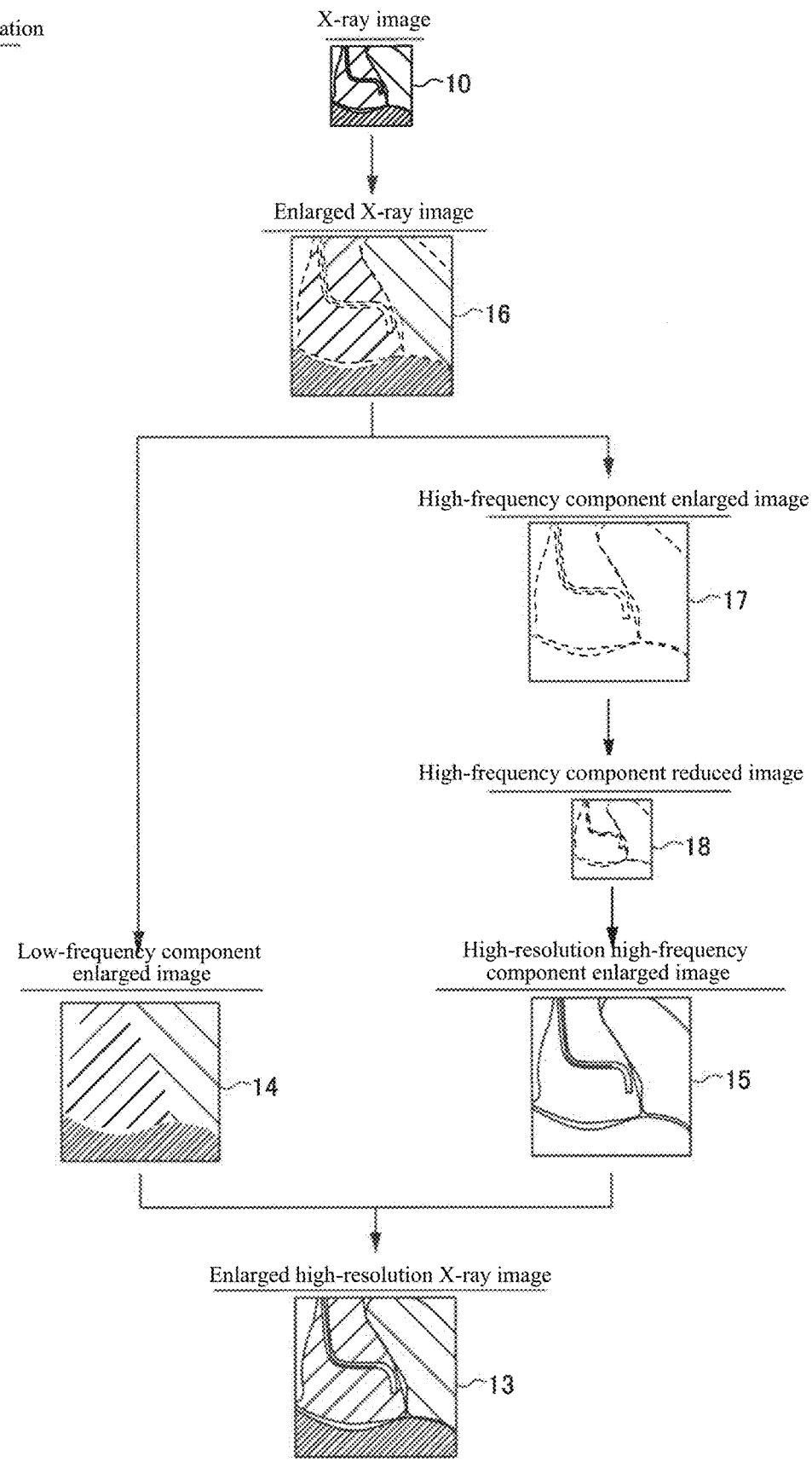
FIG. 10 is a schematic diagram for explaining enlargement processing, frequency resolution processing, reduction processing, and processing for improving a resolution, and processing for generating a high-resolution X-ray image according to the first modification.

As shown in FIG. 10, the image enlargement unit 20d according to the first modification (see FIG. 9) is configured to enlarge the X-ray image 10 before performing the frequency resolution processing by the frequency resolution processing unit 2a. Specifically, the image enlargement unit 20d enlarges the X-ray image 10 to generate the enlarged X-ray image 16. When the size and enlargement ratio of images to be enlarged are equal to each other, the image enlargement unit 2d may be used.

Further, as shown in FIG. 10, in the first modification, the frequency resolution processing unit 20a (see FIG. 9) is configured to generate a low-frequency component enlarged image 14 and a high-frequency component enlarged image 17, from the enlarged X-ray image 16. The frequency resolution processing performed by the frequency resolution processing unit 20a is the same as the frequency component processing performed by the frequency resolution processing unit 2a according to the above-described embodiment, and therefore the detailed descriptions thereof will be omitted.

Further, as shown in FIG. 10, in the first modification, the image reduction unit 2e (see FIG. 9) is configured to reduce the high-frequency component enlarged image 17 to acquire the high-frequency component reduced image 18. In the first modification, the image reduction unit 2e is configured to reduce the image by a reversibly convertible interpolation algorithm. The reversibly convertible interpolation algorithm includes, for example, a pixel averaging method. Note that the image reduction unit 2e reduces the high-frequency component enlarged image 17 such that the size of the high-frequency component reduced image 18 becomes equal to the size of the X-ray image 10.

Further, as shown in FIG. 10, in the first modification, the high-resolution image generation unit 20b (see FIG. 9) is configured to generate a high-resolution high-frequency component enlarged image 15 from the high-frequency component reduced image 18 by the learning model 140.

Further, as shown in FIG. 10, in the first modification, the image synthesis unit 2c (see FIG. 9) is configured to synthesize the low-frequency component enlarged image 14 and the high-resolution high-frequency component enlarged image 15 to generate the high-resolution X-ray image 13.

Figure 11:
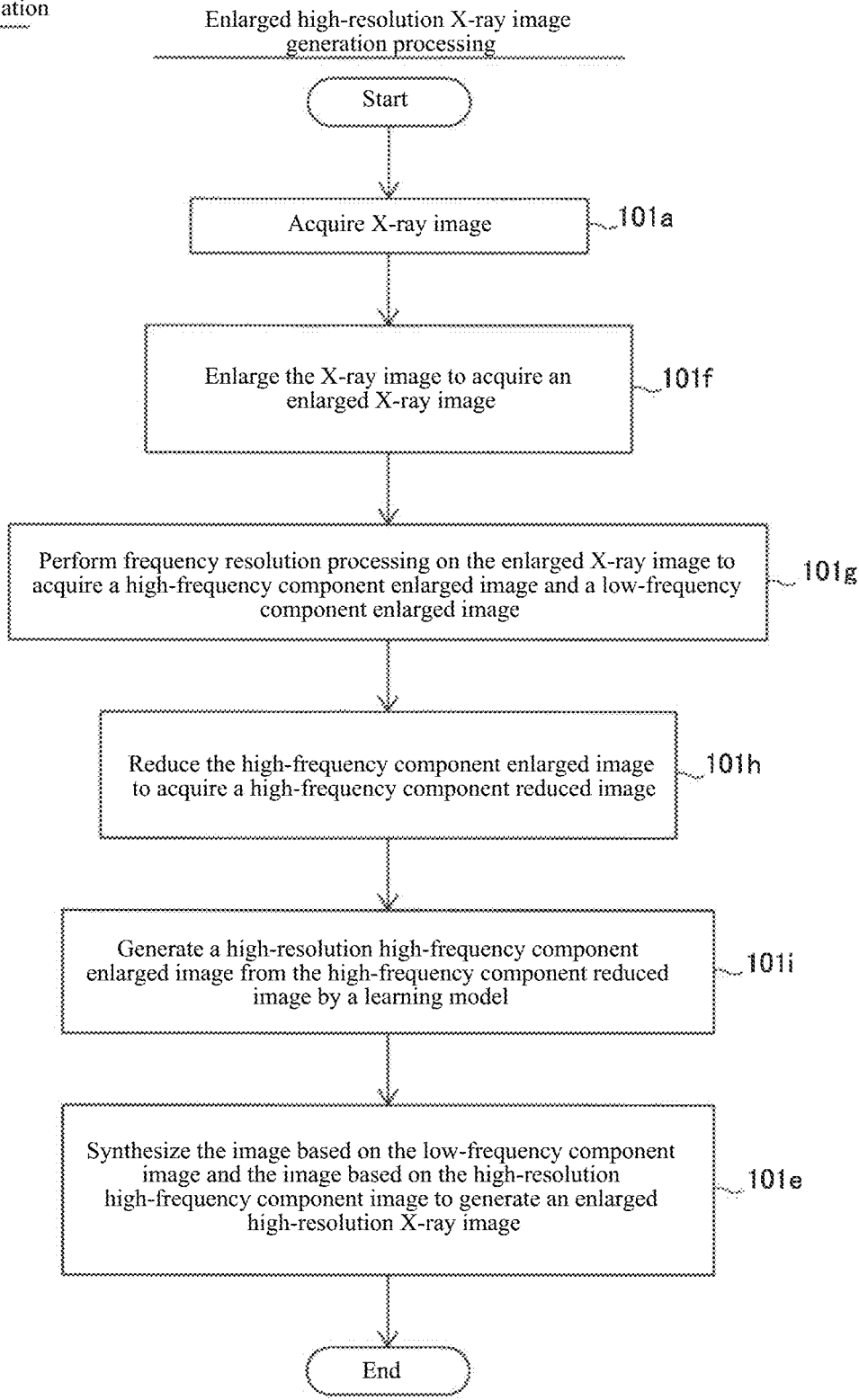
FIG. 11 is a flowchart for explaining the processing in which the image processing unit according to the first modification generates a high-resolution X-ray image enlarged in size from an X-ray image.

Next, referring to FIG. 11, the processing for generating the high-resolution X-ray image 13 in which the image processing unit 20 according to the first modification is enlarged will be described. Note that the same processing as that performed by the image processing unit 2 according to the above-described embodiment is denoted by the same reference numeral, and the detailed descriptions thereof will be omitted.

In Step 101a, the image acquisition unit 1 acquires the X-ray image 10.

In Step 101f, the image enlargement unit 20d enlarges the X-ray image 10 to acquire the enlarged X-ray image 16.

In Step 101g, the frequency resolution processing unit 20a performs the frequency resolution processing on the enlarged X-ray image 16 to acquire the high-frequency component enlarged image 17 and the low-frequency component enlarged image 14.

In Step 101h, the image reduction unit 2e reduces the high-frequency component enlarged image 17 to acquire the high-frequency component reduced image 18.

In Step 101i, the high-resolution image generation unit 20b generates the high-resolution high-frequency component enlarged image 15 from the high-frequency component reduced image 18 by the learning model 140.

In Step 101e, the image synthesis unit 2c synthesizes the image based on the low-frequency component image 12 and the image based on the high-resolution high-frequency component image to generate the enlarged high-resolution X-ray image 13. Specifically, the image synthesis unit 2c synthesizes the high-resolution high-frequency component enlarged image 15 and the low-frequency component enlarged image 14 to generate the enlarged high-resolution X-ray image 13.

Note that the rest of the configuration of the X-ray image processing apparatus 110 according to the first modification is the same as that of the X-ray image processing apparatus 100 according to the above-described embodiment.

Effects of First Modified Example

In the first modification, the following effects can be obtained.

In the first modification, as described above, the X-ray image processing apparatus 110 is further provided with the image reduction unit 2e for reducing the image. The image enlargement unit 20d is configured to enlarge the X-ray image 10 before performing the frequency resolution processing by the frequency resolution processing unit 20a.

The learning model 140 has been further trained to enlarge the image to be generate when enhancing the resolution of the image. The frequency resolution processing unit 20a is configured to generate the low-frequency component enlarged image 14 and the high-frequency component enlarged image 17 from the enlarged X-ray image 16. The image reduction unit 2e is configured to reduce the high-frequency component enlarged image 17 to acquire the high-frequency component reduced image 18. The high-resolution image generation unit 20b is configured to generate the high-resolution high-frequency component enlarged image 15 from the high-frequency component reduced image 18 by the learning model 140. The image synthesis unit 2c is configured to synthesize the low-frequency component enlarged image 14 and the high-resolution high-frequency component enlarged image 15 to generate the high-resolution X-ray image 13.

With this, based on the X-ray image 16 enlarged before performing the frequency resolution processing, the low-frequency component enlarged image 14 and the high-frequency component enlarged image 17 are acquired. Therefore, as compared with the configuration in which the X-ray image 10 is resolved into the low-frequency component image 12 and the high-frequency component image 11 by the frequency resolution processing and the enlargement processing is performed on the respective images, it is possible to suppress the increase in the number of processing steps.

Further, the high-resolution high-frequency component enlarged image 15 is generated from the high-frequency component reduced image 18 using the learning model 140. Therefore, as compared with the configuration of generating the high-resolution high-frequency component enlarged image 15 from the high-frequency component enlarged image 17, it becomes possible to reduce the size of the image to which the learning model 140 is applied. Therefore, it is possible to suppress an increase in the processing load.

Further, in the first modification, as described above, the image reduction unit 2e is configured to reduce the image by the reversibly convertible interpolation algorithm. With this, even when generating the high-frequency component reduced image 18 by reducing the high-frequency component enlarged image 17, it is possible to suppress the missing of the information on the pixel value included in the high-frequency component enlarged image 17.

The other effects of the first modification are the same as those of the above-described embodiment.

Second Modification

Further, in the above-described embodiment, an example in which the image enlargement unit 2d is configured to enlarge the image after performing the frequency resolution processing bof the X-ray image 10 by the frequency resolution processing unit 2a is shown, but the present invention is not limited thereto. For example, in the second modification shown in FIG. 12, the image enlargement unit 21d may be configured to enlarge the X-ray image 10 before performing the frequency resolution processing by the frequency resolution processing unit 21a.

Figure 12:
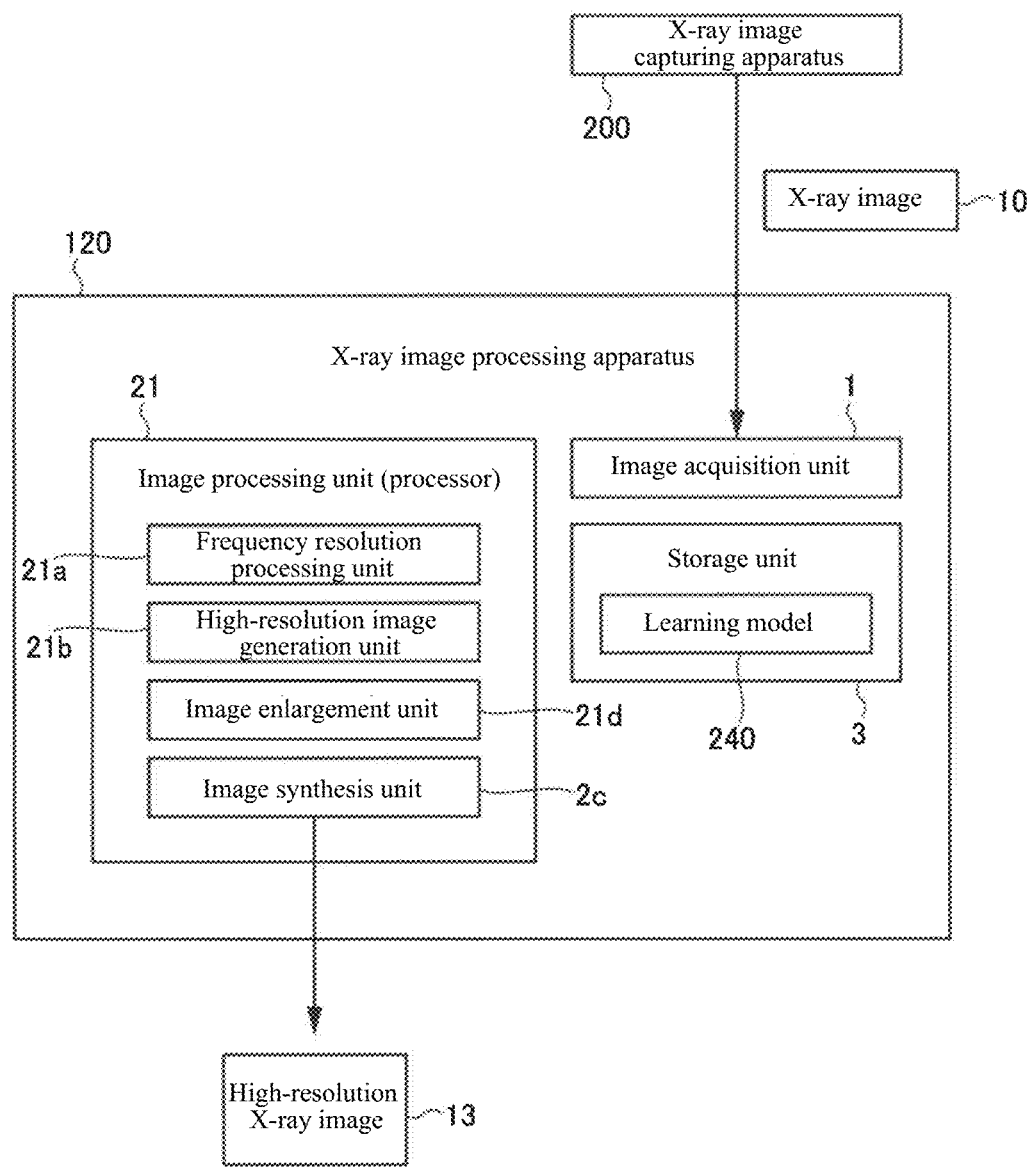
FIG. 12 is a schematic diagram showing an entire configuration of an X-ray image processing apparatus according to a second modification.

As shown in FIG. 12, the X-ray image processing apparatus 120 according to the second modification differs from the X-ray image processing apparatus 100 according to the above-described embodiment in the following point. That is, the X-ray image processing apparatus 120 according to the second modification is provided with an image processing unit 21 in place of the image processing unit 2. In the X-ray image processing apparatus 120 according to the second modification, the learning model 240 is stored in the storage unit 3 in place of the learning model 40.

The image processing unit 21 differs from the image processing unit 2 according to the above-described embodiment in the following point. That is, the image processing unit 21 is provided with the frequency resolution processing unit 21a in place of the frequency resolution processing unit 2a. The image processing unit 21 is provided with the high-resolution image generation unit 21b in place of the high-resolution image generation unit 2b. Further, the image processing unit 21 is provided with the image enlargement unit 21d in place of the image enlargement unit 2d.

Figure 13:
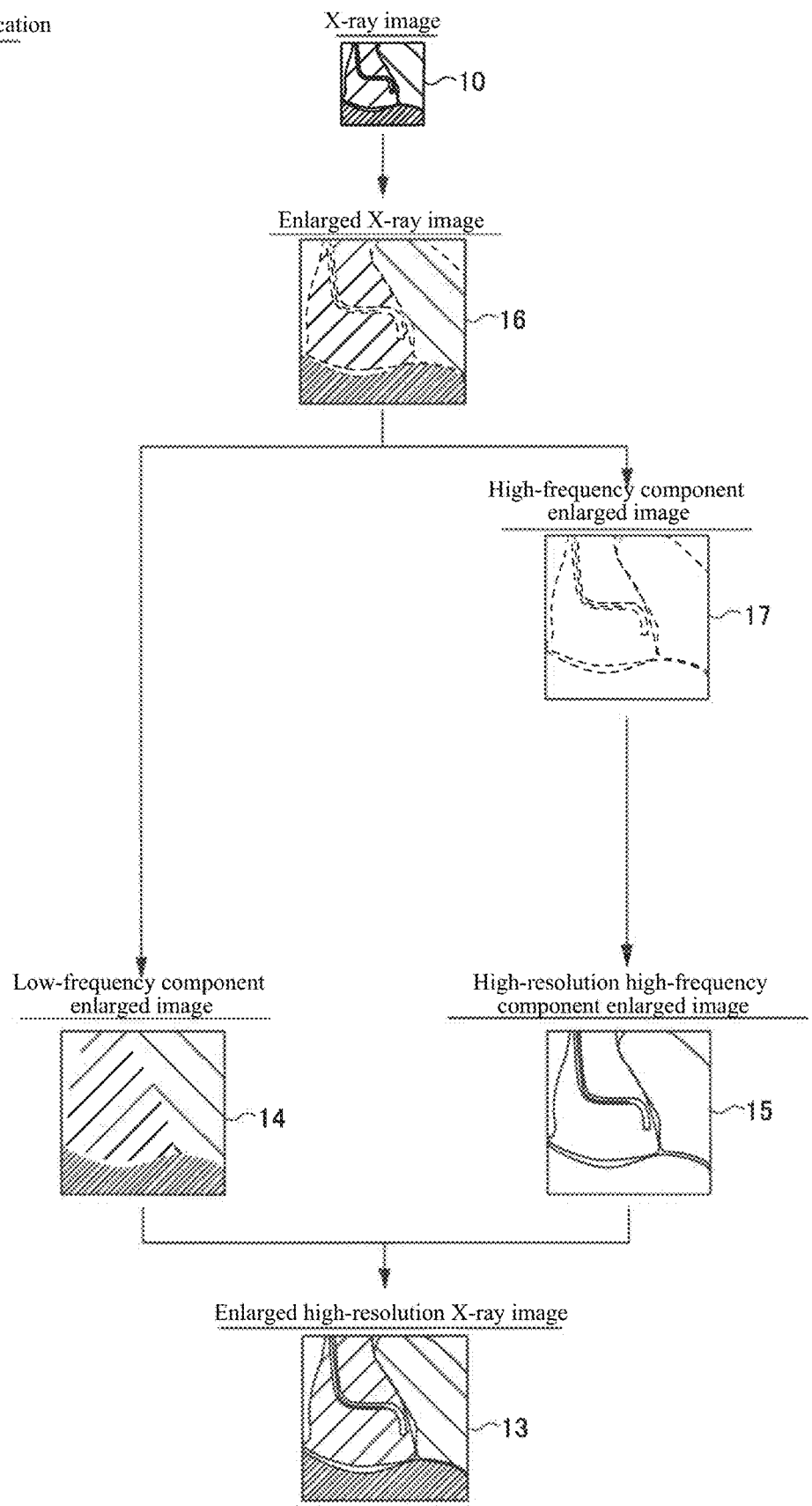
FIG. 13 is a schematic diagram for explaining enlargement processing, frequency resolution processing, and processing for improving a resolution, and processing for generating a high-resolution X-ray image according to the second modification.

The learning model 240 differs from the learning model 40 according to the above-described embodiment in that the high-resolution high-frequency component enlarged image 15 (see FIG. 13) is generated from the high-resolution high-frequency component enlarged image 17 (see FIG. 13). That is, the learning model 240 has not been trained to enlarge the image, unlike the learning model 40.

As shown in FIG. 13, the image enlargement unit 21d (see FIG. 12) is configured to enlarge the X-ray image 10 before performing the frequency resolution processing by the frequency resolution processing unit 21a. That is, the image enlargement unit 21d is configured to enlarge the X-ray image 10 to generate the enlarged X-ray image 16. In other words, the image enlargement unit 21d is the same in configuration as the image enlargement unit 20d according to the first modification.

Further, as shown in FIG. 13, in the second modification, the frequency resolution processing unit 21a (see FIG. 12) is configured to generate the low-frequency component enlarged image 14 and the high-frequency component enlarged image 17 from the enlarged X-ray image 16. That is, the frequency resolution processing unit 21a is the same in configuration as the frequency resolution processing unit 20a according to the first modification.

Further, as shown in FIG. 13, in the second modification, the high-resolution image generation unit 21b (see FIG. 12) is configured to generate the high-resolution high-frequency component enlarged image 15 from the high-frequency component enlarged image 17 by the learning model 240.

Further, as shown in FIG. 13, in the second modification, the image synthesis unit 2c (see FIG. 12) is configured to synthesize the low-frequency component enlarged image 14 and the high-resolution high-frequency component enlarged image 15 to generate the high-resolution X-ray image 13.

Figure 14:
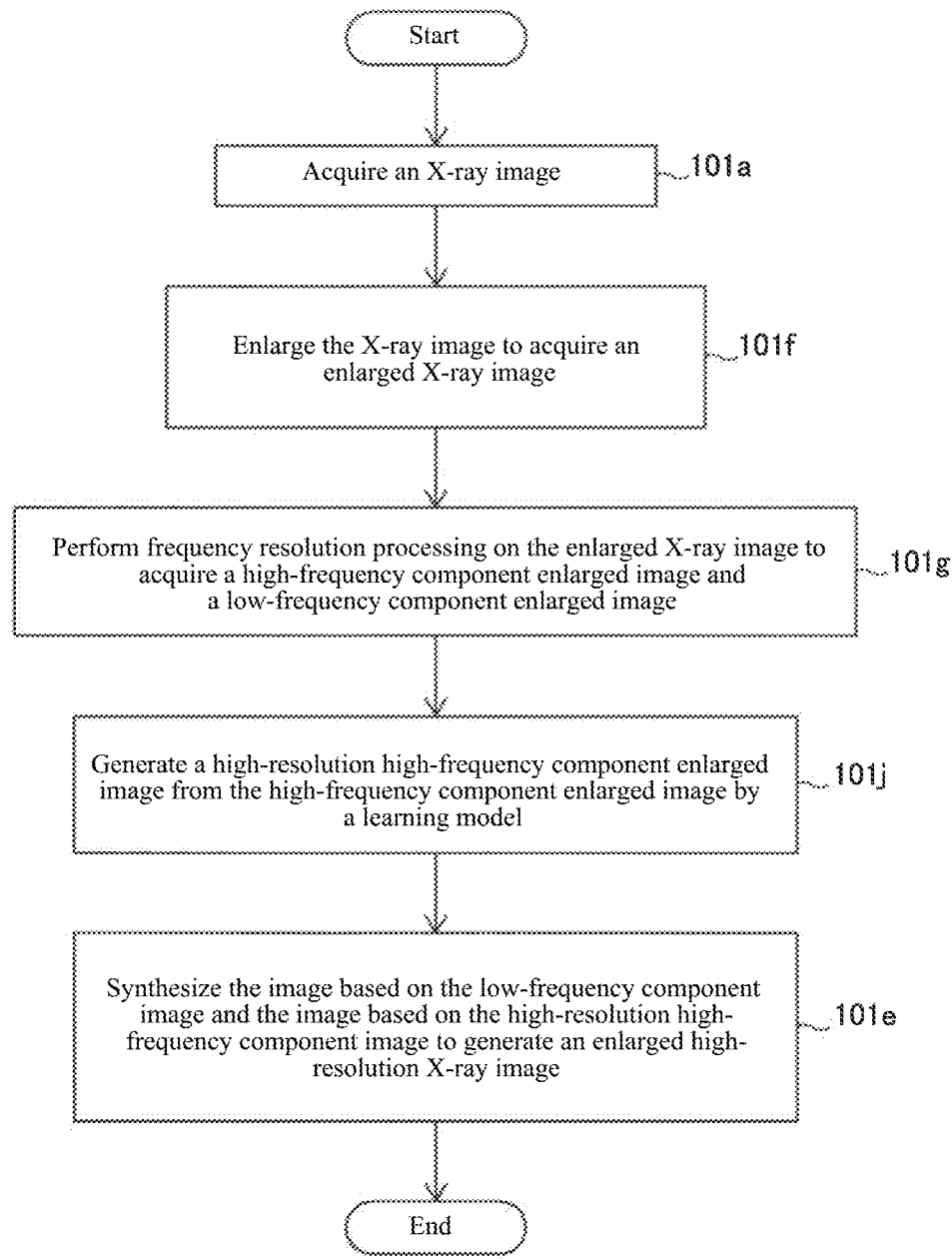
FIG. 14 is a flowchart for explaining processing in which the image processing unit according to the second modification generates a high-resolution X-ray image enlarged in size from an X-ray image.

Next, referring to FIG. 14, the processing for generating the high-resolution X-ray image 13 in which the image processing unit 21 is enlarged according to the second modification will be described. Note that the processing similar to that performed by the image processing unit 2 according to the above-described embodiment and the first modification will be denoted by the same reference numeral, and the detailed descriptions thereof will be omitted.

In Step 101a, the image acquisition unit 1 acquires the X-ray image 10.

In Step 101f, the image enlargement unit 21d enlarges the X-ray image 10 to acquire the enlarged X-ray image 16.

In Step 101g, the frequency resolution processing unit 21a performs the frequency resolution processing on the enlarged X-ray image 16 to acquire the high-frequency component enlarged image 17 and the low-frequency component enlarged image 14.

In Step 101j, the high-resolution image generation unit 21b generates the high-resolution high-frequency component enlarged image 15 from the high-frequency component enlarged image 17 by the learning model 240.

In Step 101e, the image synthesis unit 2c synthesizes the image based on the low-frequency component image 12 and the image based on the high-resolution high-frequency component image to generate the enlarged high-resolution X-ray image 13. Specifically, the image synthesis unit 2c synthesizes the high-resolution high-frequency component enlarged image 15 and the low-frequency component enlarged image 14 to generate the enlarged high-resolution X-ray image 13.

The rest of the configuration of the X-ray image processing apparatus 120 according to the second modification is the same as that of the X-ray image processing apparatus 100 according to the above-described embodiment.

Effects of Second Modification

In the second modification, the following effects can be obtained.

In the second modification, as described above, the image enlargement unit 21d is configured to enlarge the X-ray image 10 before performing the frequency resolution processing by the frequency resolution processing unit 21a. The frequency resolution processing unit 21a is configured to generate the low-frequency component enlarged image 14 and the high-frequency component enlarged image 17 from the enlarged X-ray image 16. The high-resolution image generation unit 21b is configured to generate the high-resolution high-frequency component enlarged image 15 from the high-frequency component enlarged image 17 by the learning model 240. The image synthesis unit 2c is configured to synthesize the low-frequency component enlarged image 14 and the high-resolution high-frequency component enlarged image 15 to generate the high-resolution X-ray image 13.

With this, by performing the frequency resolution processing on the enlarged X-ray image 16, the low-frequency component enlarged image 14 and the high-frequency component enlarged image 17 are generated. Therefore, as compared with the configuration of enlarging each of the low-frequency component image 12 and the high-frequency component image 11 acquired by performing the frequency resolution processing of the X-ray image 10, it is possible to suppress the processing step from becoming complicated.

The other effects of the second modification are the same as those of the above embodiment.

Other Modifications

In the above-described embodiment, the above-described first modification, and the above-described second modification, an example is shown in which the X-ray image processing apparatus is configured to be the processing apparatus for a medical X-ray image, as the X-ray image 10, but the present invention is not limited thereto. For example, the X-ray image processing apparatus may be configured as a processing apparatus for an X-ray image captured for non-destructive inspection applications.

Further, in the above-described embodiment, the above-described first modification, and the above-described second modification, an example is shown in which the X-ray image processing apparatus is configured separate from the imaging device image processing unit 204 of the X-ray image capturing device 200, but the present invention is not limited thereto. For example, the imaging device image processing unit 204 may be configured to function as an X-ray image processing apparatus.

In the above-described embodiment, the above-described first modification, and the above-described second modification, an example is shown in which it is configured such that the image enlargement unit enlarges the image by four times, but the present invention is not limited thereto. The enlargement ratio at which the image enlargement unit enlarges the image may be any value.

Further, in a case where the enlargement ratio of the image by the image enlargement unit is other than four, the enlargement ratio for enlarging the image by learning model 40, or the enlargement ratio for enlarging the high-frequency component image 11 by the learning model 140, or the enlargement ratio for enlarging the high-frequency component reduced image 18 by the learning model 140 may be set to the same enlargement ratio as the enlargement ratio for enlarging the image by the image enlargement unit. Further, the enlargement ratio may be configured to be changeable. In a case where the enlargement ratio is changeable, the learning model corresponding to each enlargement ratio may be stored in the storage unit 3. Further, in a case where the enlargement ratio is changeable, it may be configured such that the learning model is trained to enlarge the image to the maximum enlargement ratio at the time of the enlargement by the image enlargement unit, and the image may be reduced to the desired maximum enlargement ratio.

In the above-described embodiment, the above-described first modification, and the above-described second modification, an example in which it is configured such that the image enlargement unit enlarges the image by the nearest neighbor algorithm is shown, but the present invention is not limited thereto. For example, the image enlargement unit may be configured to enlarge the image by a linear function or a nonlinear function.

In the above-described first modification, an example is shown in which it is configured such that the image reduction unit 2e reduces the image by the pixel averaging method, but the present invention is not limited thereto. For example, the image reduction unit 2e may be configured to reduce the image by a linear function or a nonlinear function.

Further, in the above-described embodiment, the above-described first modification, and the above-described second modification, an example is shown in which it is configured such that the image processing unit generates the high-resolution X-ray image 13 with a resolution of 2048×2048 from the X-ray image 10 with a resolution of 1024×1024, but the present invention is not limited thereto.

For example, it may be configured such that the image processing unit generates a high-resolution X-ray image 13 with a resolution of 1024×1024 from an X-ray image 10 with a resolution of 512×512. Further, the image processing unit may be configured to generate a high-resolution X-ray image 13 with a resolution of 4096×4096 from an X-ray image 10 with a resolution of 2048×2048. If the resolution of the high-resolution X-ray image 13 is higher than the resolution of the X-ray image 10, the resolution of the X-ray image 10 and that of the high-resolution X-ray image 13 may be any resolution.

In the above-described embodiment and the above-described first modification, an example is shown in which the high-resolution image generation unit generates the high-resolution high-frequency component enlarged image 15 from the high-frequency component image 11 (high-frequency component reduced image 18) by the learning model 40 (learning model 140), but the present invention is not limited thereto. For example, the high-resolution image generation unit may be configured to generate a high-resolution high-frequency component image from the high-frequency component image 11 (high-frequency component reduced image 18).

That is, the learning model 40 (learning model 140) is not required to have been trained the processing for enlarging an image. In a case where the learning model 40 (learning model 140) has not trained the processing for enlarging the image, it may be configured such that the image enlargement unit enlarges the high-resolution high-frequency component image to generate the high-resolution high-frequency component enlarged image 15.

Further, in the above-described embodiment, the above-described first modification, and, the above-described second modification, an example is shown in which it is configured such that the high-resolution image generation unit 15 generates the high-resolution high-frequency component enlarged image 15, from the high-frequency component image 11 (the high-frequency component enlarged image 17 and the high-frequency component reduced image 18), but the present invention is not limited thereto. For example, the high-resolution image generation unit may be configured to improve the resolution of the low-frequency component image 12 (low-frequency component enlarged image 14).

That is, the high-resolution image generation unit may be provided with the first high-resolution image generation unit for the high-frequency component image 11 and the second low-frequency component image 12. However, in a case where the high-resolution image generation unit is configured to improve the resolution of the low-frequency component image 12 (low-frequency component enlarged image 14), as the loading of the process increases, the processing time increases. For this reason, preferably, it is configured such that the high-resolution image generation unit does not perform the processing for improving the resolution of the low-frequency component image 12 (low-frequency component enlarged image 14) but perform the processing for improving the resolution of the high-frequency component image 11 (high-frequency component enlarged image 17 and high-frequency component reduced image 18).

Further, in the above-described embodiment, the above-described first modification, and the above-described second modification, an example is shown in which it is configured such that the image processing unit generates the enlarged high-resolution X-ray image 13 as a moving image from the X-ray image 10 as a moving image, but the present invention is not limited thereto.

For example, the image processing unit may be configured to generate the enlarged high-resolution X-ray image 13 as a still image from the X-ray image 10 as a still image. Further, in a case where the image processing unit is configured to generate the enlarged high-resolution X-ray image 13 as a still image, the frequency resolution processing unit may be configured to perform the frequency resolution processing by the processing other than the smoothing filter processing. Processing other than the smoothing filter processing includes, for example, a Fourier transform.

In the above-described embodiment, the above-described first modification, and the above-described second modification, an example is shown in which the frequency resolution processing unit is configured to resolve the X-ray image 10 into two images, i.e., the high-frequency component image 11 and the low-frequency component image 12, but the present invention is not limited thereto. For example, the frequency resolution processing unit may be configured to resolve the X-ray image 10 into three or more images. The number of images to be resolved is not limited as long as the image including the frequency component of the target site 50 can be resolved from the image including the frequency components, such as, e.g., the background.

In the above-described embodiment, the above-described first modification, and the above-described second modification, an example is shown in which it is configured such that the high-resolution image generation unit for performing the processing for improving the size and definition of the image by the image processing unit and each processing unit for performing the resolution, the enlargement, the synthesizing, etc., of the image are performed by the same processor, but the present invention is not limited thereto.

For example, the image processing unit may be provided with the high-resolution image generation unit as a separate processor that differs from the processor for performing each processor that performs the decomposition, the enlargement, the synthesizing, etc., of the image. That is, the image processing unit may be provided with, as a high-resolution image generation unit, a dedicated processor for performing the processing for improving the size and definition of an image.

ASPECTS

It will be understood by those skilled in the art that the above-described exemplary embodiments are concrete examples of the following aspects.

Item 1

An X-ray image processing apparatus comprising:
an image acquisition unit configured to acquire an X-ray image;
a frequency resolution processing unit configured to perform frequency resolution processing for resolving the X-ray image into a high-frequency component image and a low-frequency component image;
a high-resolution image generation unit configured to generate a high-resolution high-frequency component image from the high-frequency component image by a trained learning model that has trained to enhance a resolution of an image, the high-resolution high-frequency component image being an image higher in resolution than the high-frequency component image; and
an image synthesis unit configured to synthesize an image based on the low-frequency component image and an image based on the high-resolution high-frequency component image to generate a high-resolution X-ray image.

Item 2

The X-ray image processing apparatus as recited in the above-described Item 1,
wherein the high-resolution image generation unit is configured to perform processing for generating the high-resolution high-frequency component image from the high-frequency component image, without performing processing for generating an image higher in resolution than the low-frequency component image from the low-frequency component image.

Item 3

The X-ray image processing apparatus as recited in the above-described Item 1,
wherein the frequency resolution processing unit is configured to perform frequency resolution processing in which a frequency band to be resolved is set such that frequency components of a predetermined target site in the X-ray image become high-frequency side components.

Item 4

The X-ray image processing apparatus as recited in the above-described Item 3,
wherein the X-ray image is an image reflecting a blood vessel of a subject and a device introduced into the blood vessel, and
wherein the target site includes an edge of the blood vessel and an edge of the device.

Item 5

The X-ray image processing apparatus as recited in the above-described Item 1,
wherein the image acquisition unit is configured to acquire the X-ray image as a moving image,
wherein the frequency resolution processing unit is configured to perform frequency resolution processing on an acquired frame each time a frame of the X-ray image as a moving image is acquired to acquire the low-frequency component image and the high-frequency component image for each frame,
wherein the high-resolution image generation unit is configured to generate the high-resolution high-frequency component image from the high-frequency component image acquired for each frame, and
wherein the image synthesis unit is configured to synthesize the low-frequency component image for each frame and the high-resolution high-frequency component image for each frame to generate the high-resolution X-ray image as a moving image.

Item 6

The X-ray image processing apparatus as recited in the above-described Item 1,
wherein the frequency resolution processing unit is configured to perform smoothing filter processing on the X-ray image to acquire the low-frequency component image and subtract the low-frequency component image from the X-ray image to acquire the high-frequency component image.

Item 7

The X-ray image processing apparatus as recited in the above-described Item 1, further comprising:
an image enlargement unit configured to enlarge an image,
wherein the image enlargement unit is configured to enlarge the image either before performing the frequency resolution processing by the frequency resolution processing unit or after performing the frequency resolution processing.

Item 8

The X-ray image processing apparatus as recited in the above-described Item 7,
wherein the image enlargement unit is configured to enlarge the low-frequency component image acquired by performing the frequency resolution processing by the frequency resolution processing unit to generate a low-frequency component enlarged image,
wherein the learning model has further trained to enlarge the image to be generated when increasing the resolution of the image,
wherein the high-resolution image generation unit is configured to generate a high-resolution high-frequency component enlarged image improved in resolution than the high-frequency component image and enlarged in size, from the high-frequency component image by the learning model, and
wherein the image synthesis unit is configured to synthesize the low-frequency component enlarged image and the high-resolution high-frequency component enlarged image to generate the high-resolution X-ray image.

Item 9

The X-ray image processing apparatus as recited in the above-described Item 7, further comprising:
an image reduction unit configured to reduce an image,
wherein the image enlargement unit is configured to enlarge the X-ray image before performing the frequency resolution processing by the frequency resolution processing unit,
wherein the learning model has further trained to enlarge the image to be generated when enhancing the resolution of the image,
wherein the frequency resolution processing unit is configured to generate a low-frequency component enlarged image and a high-frequency component enlarged image, from the enlarged X-ray image,
wherein the image reduction unit is configured to reduce the high-frequency component enlarged image to acquire a high-frequency component reduced image,
wherein the high-resolution image generation unit is configured to generate a high-resolution high-frequency component enlarged image from the high-frequency component reduced image, by the learning model, and
wherein the image synthesis unit is configured to synthesize the low-frequency component enlarged image and the high-resolution high-frequency component enlarged image to generate the high-resolution X-ray image.

Item 10

The X-ray image processing apparatus as recited in the above-described Item 7,
wherein the image enlargement unit is configured to enlarge the X-ray image before performing the frequency resolution processing by the frequency resolution processing unit,
wherein the frequency resolution processing unit is configured to generate a low-frequency component enlarged image and a high-frequency component enlarged image from the enlarged X-ray image, wherein the high-resolution image generation unit is configured to generate the high-resolution high-frequency component enlarged image from the high-frequency component enlarged image, by the learning model, and wherein the image synthesis unit is configured to synthesize the low-frequency component enlarged image and the high-resolution high-frequency component enlarged image to generate the high-resolution X-ray image.

Item 11

The X-ray image processing apparatus as recited in any one of the above-described Items 7 to 10,
wherein the image enlargement unit is configured to enlarge the image by a reversibly convertible interpolation algorithm.

Item 12

The X-ray image processing apparatus as recited in the above-described Item 9,
wherein the image reduction unit is configured to reduce the image by a reversibly convertible interpolation algorithm.

Item 13

An X-ray image processing method comprising the steps of:
acquiring an X-ray image;
performing frequency resolution processing for resolving the X-ray image into a high-frequency component image and a low-frequency component image;
producing a high-resolution high-frequency component image from the high-frequency component image by a trained learning model, the high-resolution high-frequency component image being an image higher in resolution than the high-frequency component image; and
synthesizing an image based on the low-frequency component image and an image based on the high-resolution high-frequency component image to generate a high-resolution X-ray image.

The invention claimed is:

1. An X-ray image processing apparatus comprising:
an image acquisition unit configured to acquire an X-ray image;
a frequency resolution processing unit configured to perform frequency resolution processing for resolving the X-ray image into a high-frequency component image and a low-frequency component image;
a high-resolution image generation unit configured to generate a high-resolution high-frequency component image from the high-frequency component image by a trained learning model that has been trained to enhance a resolution of an image without performing processing for generating an image higher in resolution than the low-frequency component image from the low-frequency component image, the high-resolution high-frequency component image being an image higher in resolution than the high-frequency component image; and
an image synthesis unit configured to synthesize an image based on the low-frequency component image without being made high definition and an image based on the high-resolution high-frequency component image that is high definition to generate a high-resolution X-ray image.

2. The X-ray image processing apparatus as recited in claim 1,
wherein the frequency resolution processing unit is configured to perform frequency resolution processing in which a frequency band to be resolved is set such that frequency components of a predetermined target site in the X-ray image become high-frequency side components.

3. The X-ray image processing apparatus as recited in claim 2,
wherein the X-ray image is an image reflecting a blood vessel of a subject and a device introduced into the blood vessel, and
wherein the target site includes an edge of the blood vessel and an edge of the device.

4. The X-ray image processing apparatus as recited in claim 1,
wherein the image acquisition unit is configured to acquire the X-ray image as a moving image,
wherein the frequency resolution processing unit is configured to perform frequency resolution processing on an acquired frame each time a frame of the X-ray image as a moving image is acquired to acquire the low-frequency component image and the high-frequency component image for each frame,
wherein the high-resolution image generation unit is configured to generate the high-resolution high-frequency component image from the high-frequency component image acquired for each frame, and
wherein the image synthesis unit is configured to synthesize the low-frequency component image for each frame and the high-resolution high-frequency component image for each frame to generate the high-resolution X-ray image as a moving image.

5. The X-ray image processing apparatus as recited in claim 1,
wherein the frequency resolution processing unit is configured to perform smoothing filter processing on the X-ray image to acquire the low-frequency component image and subtract the low-frequency component image from the X-ray image to acquire the high-frequency component image.

6. The X-ray image processing apparatus as recited in claim 1, further comprising:
an image enlargement unit configured to enlarge an image,
wherein the image enlargement unit is configured to enlarge the image either before performing the frequency resolution processing by the frequency resolution processing unit or after performing the frequency resolution processing.

7. The X-ray image processing apparatus as recited in claim 6,
wherein the image enlargement unit is configured to enlarge the low-frequency component image acquired by performing the frequency resolution processing by the frequency resolution processing unit to generate a low-frequency component enlarged image,
wherein the learning model has further trained to enlarge the image to be generated when increasing the resolution of the image,
wherein the high-resolution image generation unit is configured to generate a high-resolution high-frequency component enlarged image improved in resolution than the high-frequency component image and enlarged in size, from the high-frequency component image by the learning model, and wherein the image synthesis unit is configured to synthesize the low-frequency component enlarged image and the high-resolution high-frequency component enlarged image to generate the high-resolution X-ray image.

8. The X-ray image processing apparatus as recited in claim 6, further comprising:

an image reduction unit configured to reduce an image, wherein the image enlargement unit is configured to enlarge the X-ray image before performing the frequency resolution processing by the frequency resolution processing unit, wherein the learning model has further trained to enlarge the image to be generated when enhancing the resolution of the image, wherein the frequency resolution processing unit is configured to generate a low-frequency component enlarged image and a high-frequency component enlarged image, from the enlarged X-ray image, wherein the image reduction unit is configured to reduce the high-frequency component enlarged image to acquire a high-frequency component reduced image, wherein the high-resolution image generation unit is configured to generate a high-resolution high-frequency component enlarged image from the high-frequency component reduced image, by the learning model, and wherein the image synthesis unit is configured to synthesize the low-frequency component enlarged image and the high-resolution high-frequency component enlarged image to generate the high-resolution X-ray image.

9. The X-ray image processing apparatus as recited in claim 6, wherein the image enlargement unit is configured to enlarge the X-ray image before performing the frequency resolution processing by the frequency resolution processing unit, wherein the frequency resolution processing unit is configured to generate a low-frequency component enlarged image and a high-frequency component enlarged image from the enlarged X-ray image, wherein the high-resolution image generation unit is configured to generate the high-resolution high-frequency component enlarged image from the high-frequency component enlarged image, by the learning model, and wherein the image synthesis unit is configured to synthesize the low-frequency component enlarged image and the high-resolution high-frequency component enlarged image to generate the high-resolution X-ray image.

10. The X-ray image processing apparatus as recited in claim 6, wherein the image enlargement unit is configured to enlarge the image by a reversibly convertible interpolation algorithm.

11. The X-ray image processing apparatus as recited in claim 8, wherein the image reduction unit is configured to reduce the image by a reversibly convertible interpolation algorithm.

12. An X-ray image processing method comprising the steps of:

acquiring an X-ray image;

performing frequency resolution processing for resolving the X-ray image into a high-frequency component image and a low-frequency component image;

producing a high-resolution high-frequency component image from the high-frequency component image by a trained learning model that has been trained to enhance a resolution of an image without generating an image higher in resolution than the low-frequency component image from the low-frequency component image, the high-resolution high-frequency component image being an image higher in resolution than the high-frequency component image; and synthesizing an image based on the low-frequency component image without being made high definition and an image based on the high-resolution high-frequency component image being made high definition to generate a high-resolution X-ray image.

13. An X-ray image processing apparatus comprising:

an image acquisition unit configured to acquire an X-ray image of a blood vessel of a subject and a device introduced into the blood vessel;

a frequency resolution processing unit configured to perform frequency resolution processing for resolving the X-ray image into a high-frequency component image and a low-frequency component image, wherein the high-frequency component image corresponds to an edge of the blood vessel and an edge of the device;

a high-resolution image generation unit configured to generate a high-resolution high-frequency component image from the high-frequency component image by a trained learning model that has been trained to enhance a resolution of an image without performing processing for generating an image higher in resolution than the low-frequency component image from the low-frequency component image, the high-resolution high-frequency component image being an image higher in resolution than the high-frequency component image; and an image synthesis unit configured to synthesize an image based on the low-frequency component image without being made high definition and an image based on the high-resolution high-frequency component image being made high definition to generate a high-resolution X-ray image.

14. The X-ray image processing apparatus of claim 13, wherein the low-frequency component image corresponds to a background.

15. The X-ray image processing apparatus as recited in claim 13, wherein the image acquisition unit is configured to acquire the X-ray image as a moving image, wherein the frequency resolution processing unit is configured to perform frequency resolution processing on an acquired frame each time a frame of the X-ray image as a moving image is acquired to acquire the low-frequency component image and the high-frequency component image for each frame, wherein the high-resolution image generation unit is configured to generate the high-resolution high-frequency component image from the high-frequency component image acquired for each frame, and wherein the image synthesis unit is configured to synthesize the low-frequency component image for each frame and the high-resolution high-frequency component image for each frame to generate the high-resolution X-ray image as a moving image.

16. The X-ray image processing apparatus as recited in claim 13,
wherein the frequency resolution processing unit is configured to perform smoothing filter processing on the X-ray image to acquire the low-frequency component image and subtract the low-frequency component image from the X-ray image to acquire the high-frequency component image.

17. The X-ray image processing apparatus as recited in claim 13, further comprising:
an image enlargement unit configured to enlarge the low-frequency component image acquired by performing the frequency resolution processing by the frequency resolution processing unit to generate a low-frequency component enlarged image,
wherein the learning model has been further trained to enlarge the image to be generated when increasing the resolution of the image,
wherein the high-resolution image generation unit is configured to generate a high-resolution high-frequency component enlarged image improved in resolution than the high-frequency component image and enlarged in size, from the high-frequency component image by the learning model, and
wherein the image synthesis unit is configured to synthesize the low-frequency component enlarged image and the high-resolution high-frequency component enlarged image to generate the high-resolution X-ray image.

18. The X-ray image processing apparatus as recited in claim 17, further comprising:
an image reduction unit configured to reduce an image,
wherein the image enlargement unit is configured to enlarge the X-ray image before performing the frequency resolution processing by the frequency resolution processing unit,
wherein the learning model has been further trained to enlarge the image to be generated when enhancing the resolution of the image,
wherein the frequency resolution processing unit is configured to generate a low-frequency component enlarged image and a high-frequency component enlarged image, from the enlarged X-ray image,
wherein the image reduction unit is configured to reduce the high-frequency component enlarged image to acquire a high-frequency component reduced image,
wherein the high-resolution image generation unit is configured to generate a high-resolution high-frequency component enlarged image from the high-frequency component reduced image, by the learning model, and
wherein the image synthesis unit is configured to synthesize the low-frequency component enlarged image and the high-resolution high-frequency component enlarged image to generate the high-resolution X-ray image.

* * * * *